US008152312B2

United States Patent
Kondo et al.

(10) Patent No.: US 8,152,312 B2
(45) Date of Patent: Apr. 10, 2012

(54) APPARATUS AND METHOD THAT PRESENT PROJECTION IMAGE

(75) Inventors: Tetsujiro Kondo, Tokyo (JP); Kenji Tanaka, Kanagawa (JP); Hitoshi Mukai, Kanagawa (JP); Tetsushi Kokubo, Kanagawa (JP); Hirofumi Hibi, Kanagawa (JP); Kazumasa Tanaka, Chiba (JP)

(73) Assignee: Sony Corporation, Tokyo (JP)

( * ) Notice: Subject to any disclaimer, the term of this patent is extended or adjusted under 35 U.S.C. 154(b) by 1436 days.

(21) Appl. No.: 11/681,954

(22) Filed: Mar. 5, 2007

(65) Prior Publication Data

US 2007/0211225 A1    Sep. 13, 2007

(30) Foreign Application Priority Data

Mar. 9, 2006   (JP) ................. 2006-064568

(51) Int. Cl.
*G03B 21/26* (2006.01)
(52) U.S. Cl. ............... 353/94; 353/29; 353/30; 353/34; 353/48; 353/69; 353/28; 353/31; 353/51; 353/70; 353/121; 345/1.3; 345/1.1; 345/903
(58) Field of Classification Search ............ 353/29, 353/30, 34, 48, 69, 94, 121, 51, 28, 31, 70; 348/745, 750, E9.025, E9.027, 746, 747, 348/806, 807, 840; 345/1.3, 1.1, 903, 629, 345/634, 639, 640
See application file for complete search history.

(56) References Cited

U.S. PATENT DOCUMENTS

| | | | |
|---|---|---|---|
| 6,501,441 B1 | 12/2002 | Ludtke et al. | |
| 6,727,864 B1 * | 4/2004 | Johnson et al. | 345/1.3 |
| 6,760,075 B2 * | 7/2004 | Mayer et al. | 348/383 |
| 6,804,406 B1 * | 10/2004 | Chen | 382/254 |
| 6,839,061 B1 * | 1/2005 | Kamakura et al. | 345/520 |
| 6,919,909 B1 | 7/2005 | Spletzer et al. | |
| 6,940,529 B2 * | 9/2005 | Deering | 345/647 |

(Continued)

FOREIGN PATENT DOCUMENTS

JP    6-303626    10/1994

(Continued)

OTHER PUBLICATIONS

Office Action issued Nov. 11, 2010, in Japanese Patent Application No. 2006-064568.

*Primary Examiner* — Georgia Y Epps
*Assistant Examiner* — Sultan Chowdhury
(74) *Attorney, Agent, or Firm* — Oblon, Spivak, McClelland, Maier & Neustadt, L.L.P.

(57) ABSTRACT

An apparatus that presents a projection image has a screen and plural projectors, each of which projects a section of the projection image onto the screen. The apparatus has a projected-section-determining unit that determines as a projected section the section of the projection image, based on an input image signal, corresponding to a part of the screen onto which each of the projectors projects the section of the projection image. The apparatus has an image-signal-generating unit that generates an image signal corresponding to the section of the projection image which each of the projector projects onto the part of the screen, based on the input image signal and the projected section determined by the projected-section-determining unit, and a projectors-controlling unit that controls the projectors to adjust centers and/or ranges of the projections by the projectors based on the projected section determined by the projected-section-determining unit.

13 Claims, 23 Drawing Sheets

U.S. PATENT DOCUMENTS

| | | |
|---|---|---|
| 7,114,813 B2 * | 10/2006 | Wada et al. ............... 353/70 |
| 7,367,681 B2 * | 5/2008 | Harboe ............... 353/94 |
| 7,686,457 B2 * | 3/2010 | Kobayashi et al. ............... 353/94 |
| 2004/0085256 A1 * | 5/2004 | Hereld et al. ............... 345/1.1 |
| 2005/0116968 A1 | 6/2005 | Barrus et al. |
| 2005/0206857 A1 | 9/2005 | Yamada |
| 2007/0132893 A1 * | 6/2007 | Miyazawa et al. ............... 348/745 |
| 2008/0259223 A1 * | 10/2008 | Read et al. ............... 348/745 |

FOREIGN PATENT DOCUMENTS

| | | |
|---|---|---|
| JP | 2001-136466 | 5/2001 |
| JP | 2002-112094 | 4/2002 |
| JP | 2002-207247 | 7/2002 |
| JP | 2002-277958 | 9/2002 |
| JP | 2004-15204 | 1/2004 |
| JP | 2005-196137 | 7/2005 |
| JP | 2005-354680 | 12/2005 |

* cited by examiner

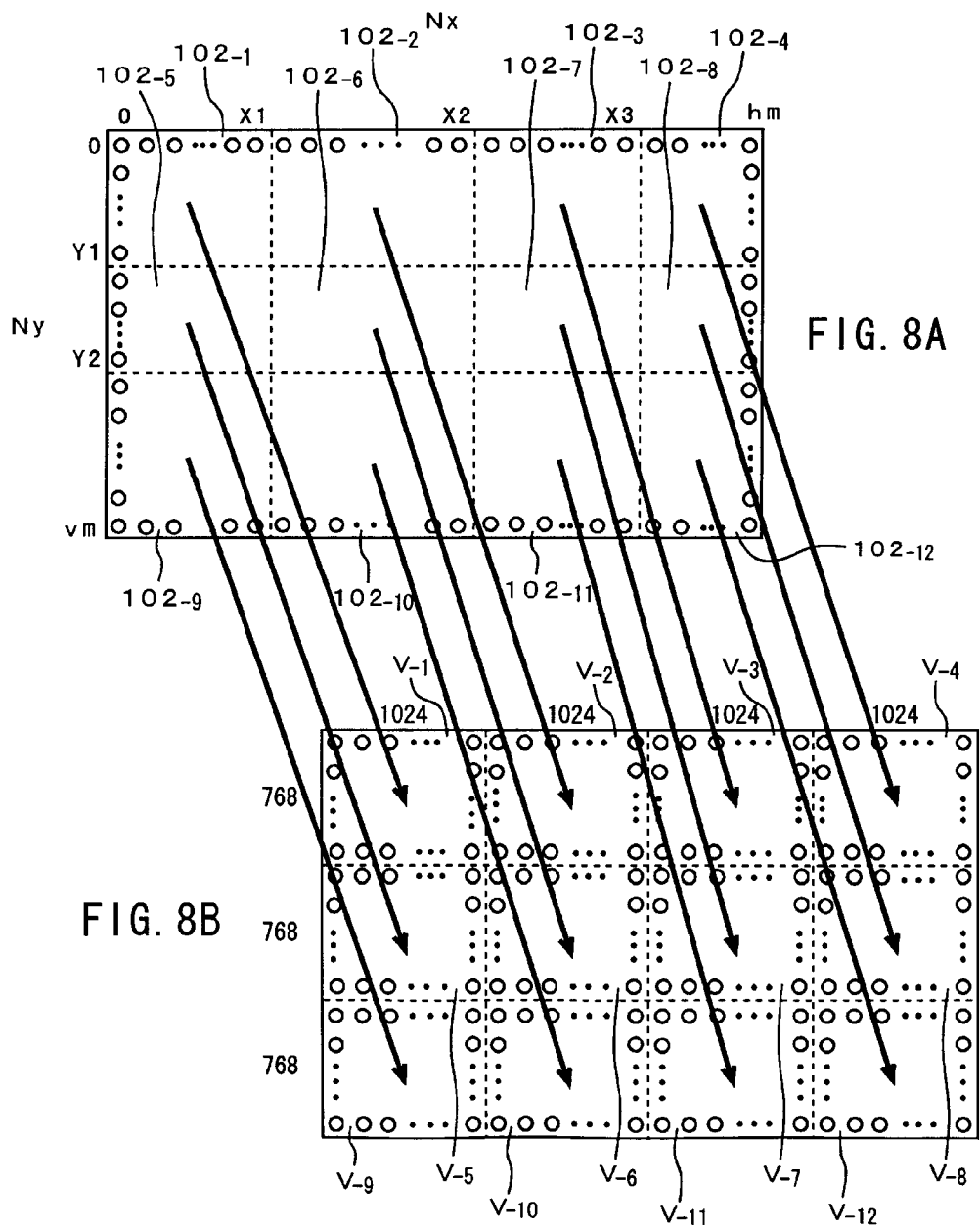

FIG. 14
ASPECT RATIO CONTROL
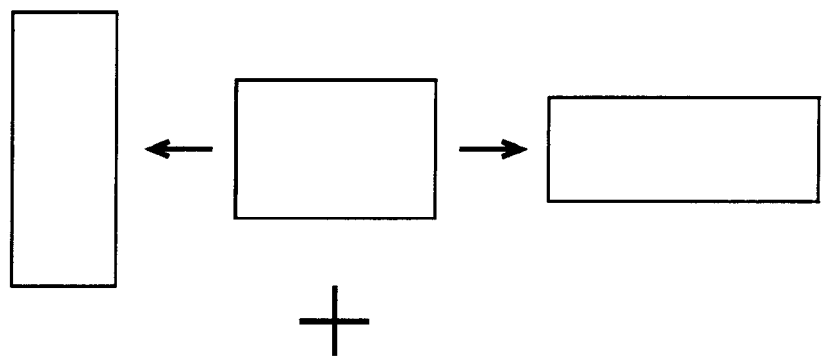
+
ZOOM RATIO CONTROL
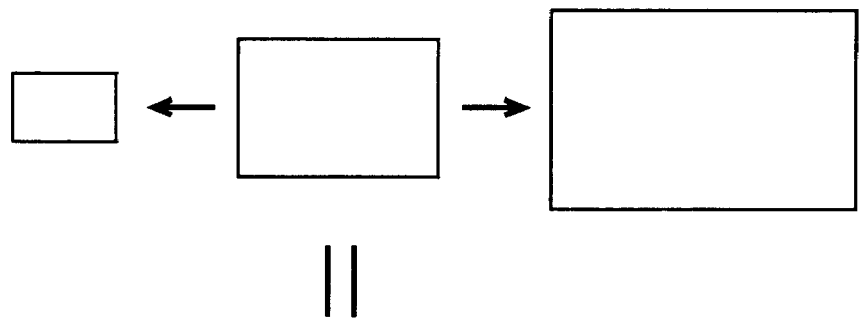
=
ARBITRARY PROJECTION-RANGE CONTROL
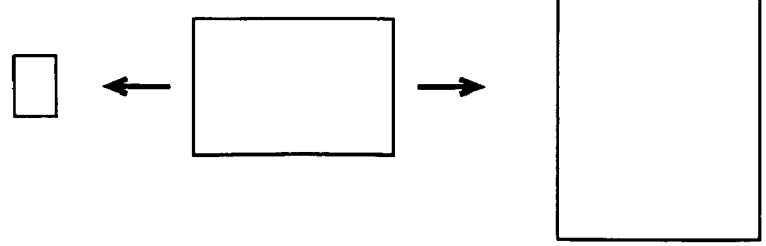

FIG. 15
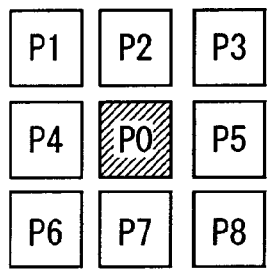
DR=MAX−MIN
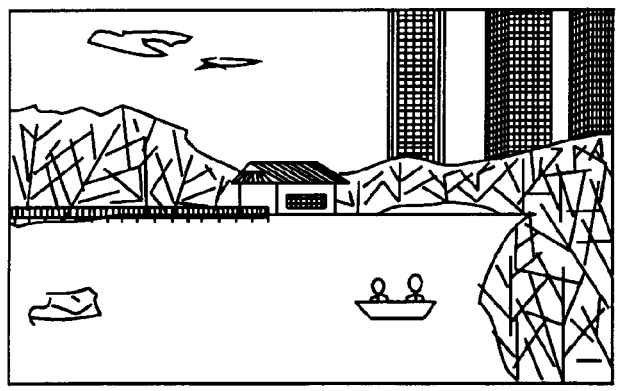
FIG. 16A
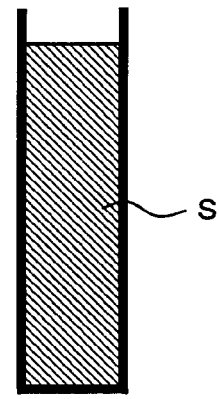
FIG. 16B
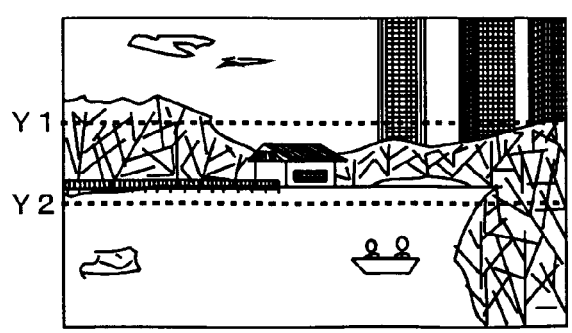
FIG. 17A
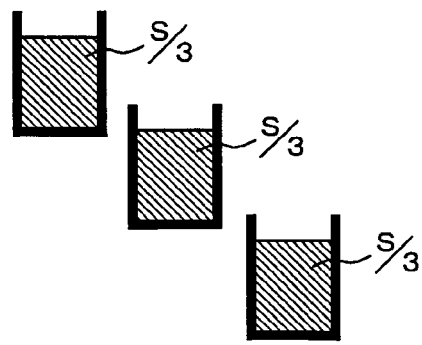
FIG. 17B

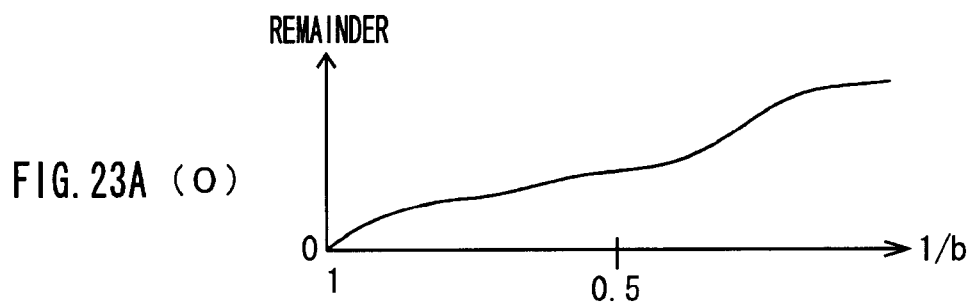
FIG. 23A (0)
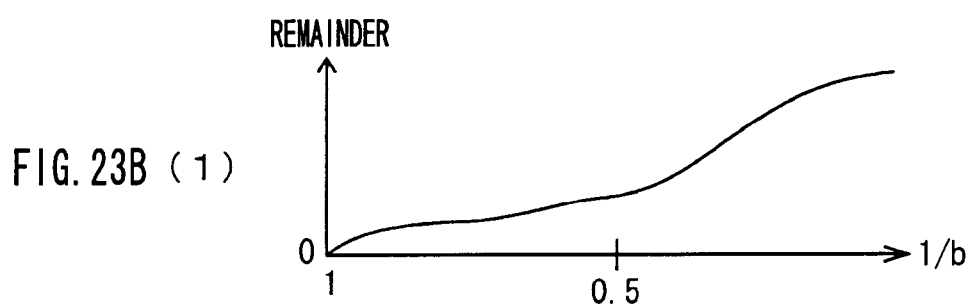
FIG. 23B (1)
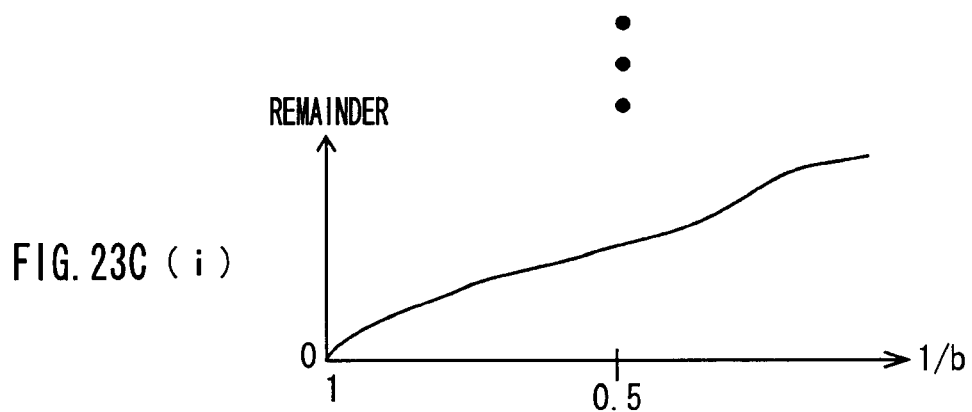
FIG. 23C (i)
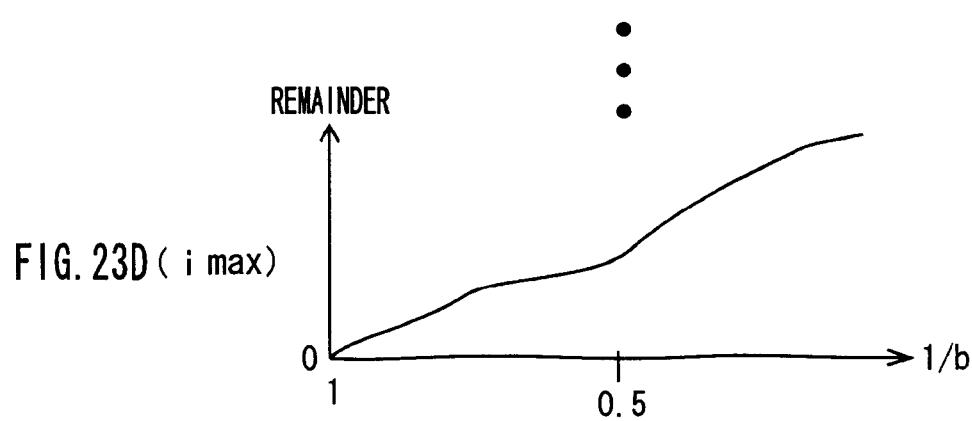
FIG. 23D (i max)

FIG. 29
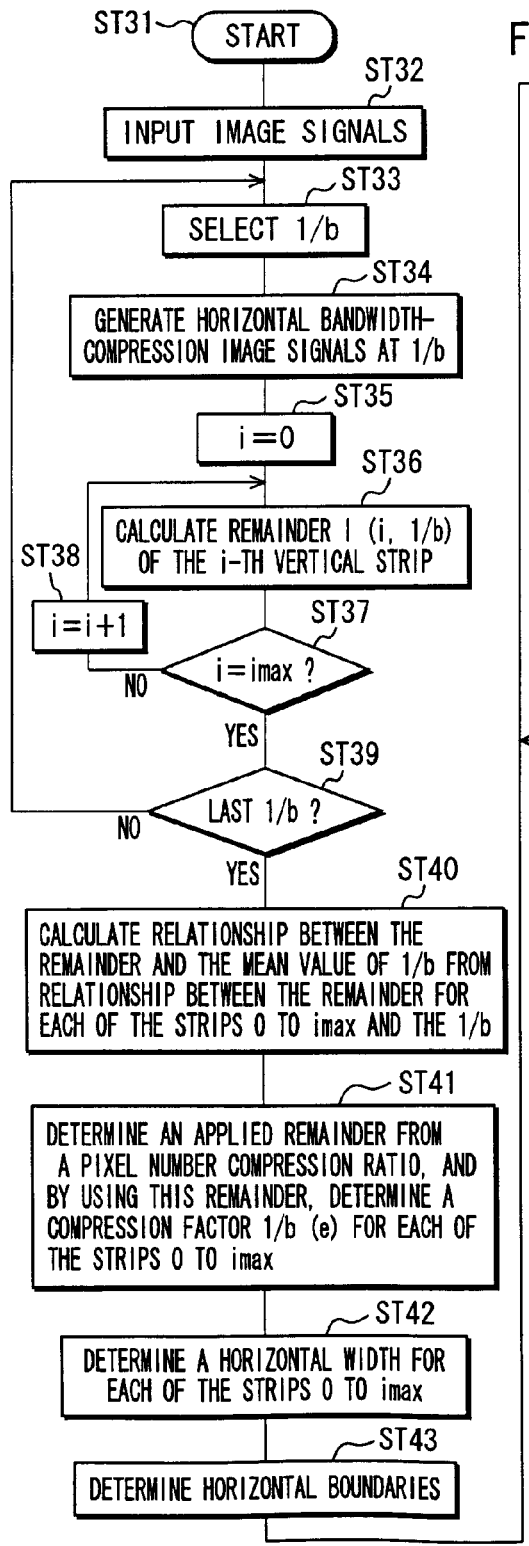
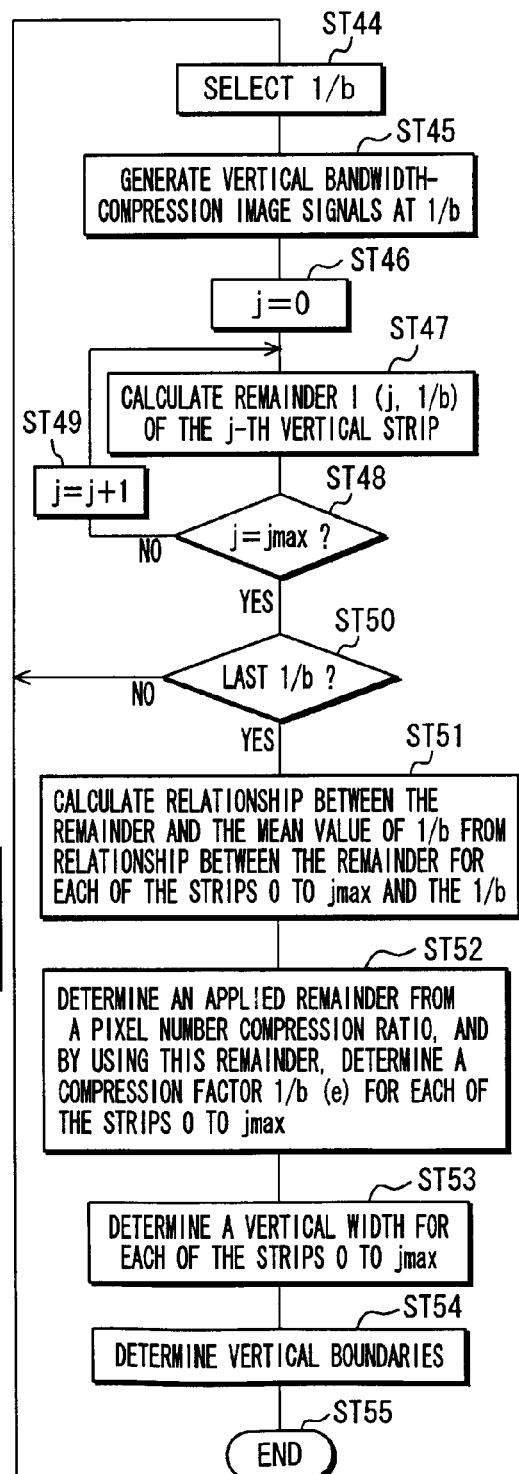

APPARATUS AND METHOD THAT PRESENT PROJECTION IMAGE

CROSS REFERENCE TO RELATED APPLICATION

The present invention contains subject matter related to Japanese Patent Application JP 2006-064568 filed in the Japanese Patent Office on Mar. 9, 2006, the entire contents of which being incorporated herein by reference.

BACKGROUND OF THE INVENTION

1. Field of the Invention

This invention relates to an apparatus and a method that present a projection image including sections of the image which a plurality of projectors project on a screen.

2. Description of Related Art

Japanese Patent Application Publication No. 2004-15204 has disclosed a multi-projection system that projects an image on a screen by using a plurality of projectors.

FIG. 1 is a schematic view of a multi-projection system 300 as related art. This multi-projection system 300 is constituted of a total of 12 projectors $301_{-1}$ to $301_{-12}$ that are arranged in a matrix of four projectors per row and three projectors per column.

FIG. 2 shows an example of a projection image 302 which these 12 projectors $301_{-1}$ to $301_{-12}$ project onto a screen 310. This projection image 302 is divided into 12 equal sections $302_{-1}$ to $302_{-12}$, and each section is a section (projected section) of the projection image 302 that each of the projectors $301_{-1}$ to $301_{-12}$ projects onto the screen 310. In FIG. 2, broken lines represent boundaries between adjacent sections among the 12 sections $302_{-1}$ to $302_{-12}$.

FIG. 3 clearly shows a relationship between each of the projectors $301_{-1}$ to $301_{-12}$ and their corresponding sections $302_{-1}$ to $302_{-12}$ of the projection image in which the displayed projection image is omitted from each of the sections. It is to be noted that slightly overlapping parts (blending regions) practically exist between the adjacent sections projected by the adjacent projectors but these overlapping parts is omitted herein.

SUMMARY OF THE INVENTION

In the multi-projection system 300 shown in FIG. 1, the section projected by an individual projector does not depend on the contents of the image 302 being projected and thus, this section is previously set and made unchanged. In other words, the number of projectors assigned per unit area of the screen 310 is constant at any parts on the screen, and the resolution (resolving power) of the display is uniform all over the screen.

However, in general, an image includes a section thereof with a large amount of information (places with fine details, for example, trees, buildings and structures) and a section thereof with a small amount of information (flat places with few details, for example, cloudless sky), as shown in FIG. 2.

In the multi-projection system 300 shown in FIG. 1, regardless of the unevenness in the amount of information in such an image, all the places in the image are presented at a constant resolution. In other words, a section showing a sky, which has a small amount of information per unit area as well as a section showing trees, buildings and structures, which has a large amount of information per unit area, are presented by using the same number of projectors.

It is desirable to provide an apparatus and a method that present a projection image having high presentation resolution without increasing the number of projectors to be used.

According to an embodiment of the present invention, there is provided an apparatus that presents a projection image. The apparatus contains a screen and plural projectors, each of which projects a section of the projection image onto the screen to reproduce the projection image. The apparatus also contains a projected-section-determining unit that determines as a projected section the section of the projection image, based on an input image signal. The section of the projection image corresponds to a part of the screen onto which each of the projectors projects the section of the projection image therefor. The apparatus further contains an image-signal-generating unit that generates an image signal corresponding to the section of the projection image which each of the projector projects onto the part of the screen, based on the input image signal and the projected section which has been determined by the projected-section-determining unit. The apparatus additionally contains a projectors-controlling unit that controls the projectors, respectively, to adjust any one of centers and ranges of the projections by the projectors based on the projected section which has been determined by the projected-section-determining unit.

In this embodiment of the present invention, plural projectors, each of which projects the section of the projection image onto the screen, are provided to reproduce the projection image on the screen. On the basis of the input image signal, a projected-section-determining unit determines as a projected section the section of the projection image corresponding to a part of the screen onto which each of the projectors projects the section of the projection image therefor. In this embodiment, the sections of the projection image to be projected by the projectors, respectively, are determined such that the number of projectors assigned to a section of the projection image containing a large amount of information per unit area is increased while the number of projectors assigned to a section of the projection image containing a small amount of information per unit area is decreased.

For example, on the basis of the input image signal, the local dynamic range is calculated by the projected-section-determining unit for each pixel by using a signal relative to the pixel and a predetermined number of other pixels adjacent to the pixel. On the basis of the local dynamic ranges for each of the pixels, the section of the projection image to be projected by each of the plural projectors is determined as the projected section such that the sum total of the local dynamic ranges for all the projected sections can be equal.

In this embodiment, as the plural projectors are arranged, for example, in a matrix of rows and columns, the section of the projection image to be projected by the projectors will be determined as follows. At first, the local dynamic range is obtained for each pixel by using a target pixel and a predetermined number of other pixels adjacent to the target pixel. Then, on the basis of the local dynamic range for each pixel, every horizontal line where the accumulated sum of the local dynamic ranges equals the quotient of the sum total of the local dynamic ranges for all the pixels divided by the number of projectors per the column is determined as a vertical section boundary. Likewise, on the basis of the local dynamic range for each pixel, every vertical line where the accumulated sum of the local dynamic ranges equals the quotient of the sum total of the local dynamic ranges for all the pixels divided by the number of projectors per the row is determined as a horizontal section boundary. In this moment, the horizontal and vertical section boundaries, which define the sections of the projection image to be projected by the projectors, are respectively continuous.

For example, it is possible that all the pixels are set as pixels belonging to each vertical section defined by the vertical section boundaries delimited as described above, and that horizontal section boundaries are then delimited for each vertical section. In this moment, the vertical section boundaries, which define the sections to be projected by the projectors, respectively, are continuous, but the horizontal section boundaries are not continuous and are positioned different for each vertical section.

It is also possible that, conversely, all the pixels are set as pixels belonging to each horizontal section defined by the horizontal section boundaries delimited as described above, and that vertical section boundaries are then delimited for each horizontal section. In this moment, the horizontal section boundaries, which define the sections to be projected by the projectors, respectively, are continuous, but the vertical section boundaries are not continuous and are positioned different for each horizontal section.

Also, preferably, for example, on the basis of the input image signal, the amount of image information is calculated for each vertical strip aligned in a horizontal direction as well as the amount of image information is calculated for each horizontal strip aligned in the vertical direction. On the basis of the amounts of image information for each of the strips, the section of the projection image to be projected by each of the projectors is determined as the projected section such that an equal amount of image information is distributed for each section.

In this case, for example, as plural projectors are arranged in a matrix of rows and columns, the section of the projection image to be projected by each of the projectors will be determined as follows. At first, the amount of image information is calculated for each vertical strip aligned in the horizontal direction by using plural bandwidth-compression image signals which are bandwidth-limited horizontally at plural levels and an original image signal thereof. Then, on the basis of the amount of image information for each vertical strip, a horizontal section boundary is delimited by every predetermined vertical line where the accumulated sum of the amounts of image information equals a quotient of the sum total of the amounts of image information for all the vertical strips divided by the number of projectors per the row Likewise, the amount of image information is calculated for each horizontal strip aligned in the vertical direction by using plural bandwidth-compression image signals which are bandwidth-limited vertically at plural levels and the original image signal thereof. Then, on the basis of the amount of image information for each horizontal strip, a vertical section boundary is delimited by every predetermined horizontal line such that the accumulated sum of the amounts of image information equals the quotient of the sum total of the amounts of image information for all the horizontal strips divided by the number of projectors per the column. In this moment, the horizontal and vertical section boundaries, which define the sections of the projection image to be projected by the projectors, respectively, are continuous.

For example, all the vertical strips are set as vertical strips belonging to the respective vertical sections defined by the vertical section boundaries, which are delimited as described above, and then horizontal section boundaries are delimited for each vertical section. In this moment, the vertical section boundaries, which define the sections of the projection image to be projected by the projectors, respectively, are continuous, but the horizontal section boundaries are not continuous and are positioned different for each vertical section.

Conversely, all the horizontal strips are set as horizontal strips belonging to all the horizontal sections defined by the horizontal section boundaries, which are delimited as described above, and then vertical section boundaries are delimited for each horizontal section. In this moment, the horizontal section boundaries, which define the sections of the projection image to be projected by the projectors, respectively, are continuous, but the vertical section boundaries are not continuous and are positioned different for each horizontal section.

According to another embodiment of this invention, there is provided a method that presents a projection image on a screen by projecting separate sections of the projection image on the screen from plural projectors. The method includes the steps of: determining as a projected section each of the sections of the projection image to be projected on the screen by each of the projectors, based on an input image signal; generating an image signal corresponding to each of the section of the projection image to be projected on the screen by each of the projectors, based on the input image signal and the projected section which has been determined at the above determining step; and controlling the projectors to adjust any one of centers and ranges of projections by the projectors based on the section of the projection image determined at the above determining step.

Thus, on the basis of the sections of the projection image projected by the respective projectors, which are determined as described above, an image signal that corresponds to each of the sections of the projection image to be projected on the screen by the projectors, respectively, is generated from the input image signal. Each projector receives its corresponding image signal which is generated in this way, to project the respective sections of the projection image.

On the basis of the sections of the projection image to be projected by the projectors, respectively, which are determined as described above, the projectors are controlled so that the centers and/or ranges of the projections by the projectors can be adjusted. Displacement of the centers of the projections by the projectors can be achieved by, for example, a lens-shift mechanism or a mechanism that uses a mirror. In addition, change of the projection ranges by the projectors can be achieved by, for example, a zoom mechanism and an aspect-ratio change mechanism that uses a cylindrical mirror or a cylindrical lens. Adjusting any one of the centers and ranges of the projections by the projectors allows the sections of the projection image to be projected onto their proper parts of the screen.

As described above, according to the embodiments of the present invention, the sections of the projection image to be projected on the screen by the plural projectors, respectively, are determined on the basis of the input image signal, and the image signal for each of the projectors is generated on the basis of the section of the projection image determined for each of the projectors. Furthermore, the centers and/or ranges of the projections by the projectors are adjusted such that the number of projectors assigned to a section of projection image containing a large amount of information per unit area of the projection image is increased while the number of projectors assigned to a section of the projection image containing a small amount of information per unit area of the projection image is decreased. This enables any high presentation resolution to be achieved without increasing the number of projectors.

The concluding portion of this specification particularly points out and directly claims the subject matter of the present invention. However, those skilled in the art will best understand both the organization and method of operation of the invention, together with further advantages and objects thereof, by reading the remaining portions of the specification in view of the accompanying drawing(s) wherein like reference characters refer to like elements.

BRIEF DESCRIPTION OF THE DRAWINGS

FIGS. 8A and 8B are diagrams each for describing a method that generates image signals that are supplied to the respective projectors;

FIG. 14 is a diagram for showing that a range of the projection can be adjusted arbitrarily by controlling the aspect ratio and the zoom rate;

FIG. 15 is a diagram for showing a local dynamic range (local DR) for each pixel, which range is used for determining the section of the projection image to be projected by each of the projectors;

FIGS. 16A and 16B are diagrams each for describing the sum total of the local DRs for the whole projection image;

FIGS. 17A and 17B are diagrams each for describing a method for determining the vertical section boundaries by using the local DRs;

FIGS. 23A to 23D are graphs each for showing a relationships between the remainder and the compression factor 1/b for each of the strips;

FIG. 29 is a flowchart for showing steps of determining the section of the projection image to be projected by each of the projectors (second method);

DESCRIPTION OF PREFERRED EMBODIMENTS

Figure 1:
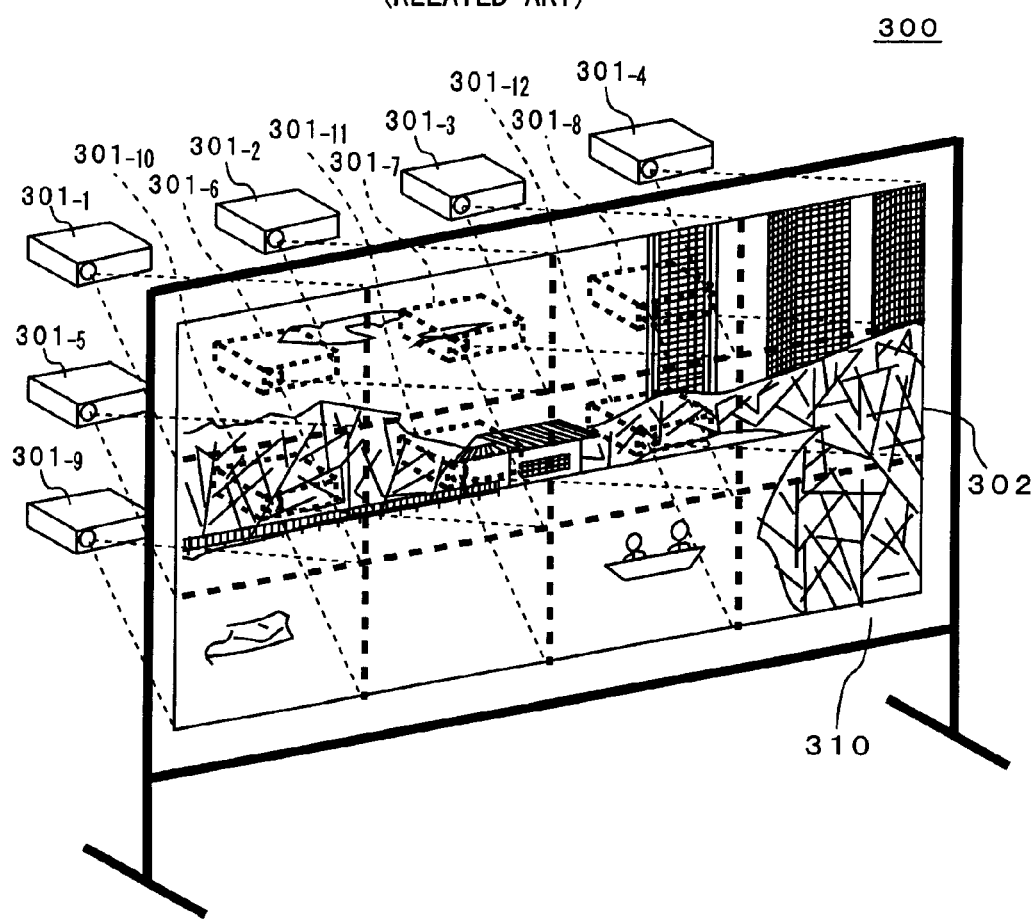
FIG. 1 is a schematic view of a multi-projection system as related art.
Figure 2:
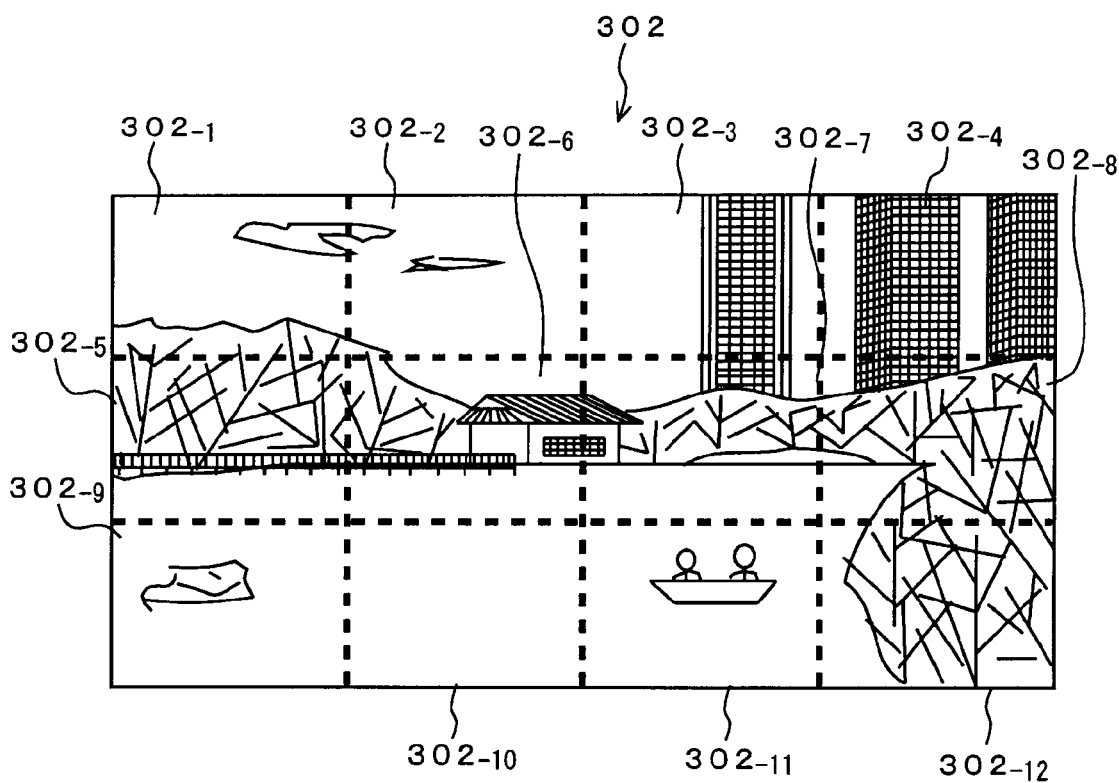
FIG. 2 is a diagram for showing a projection image and its sections projected by the corresponding projectors.
Figure 3:
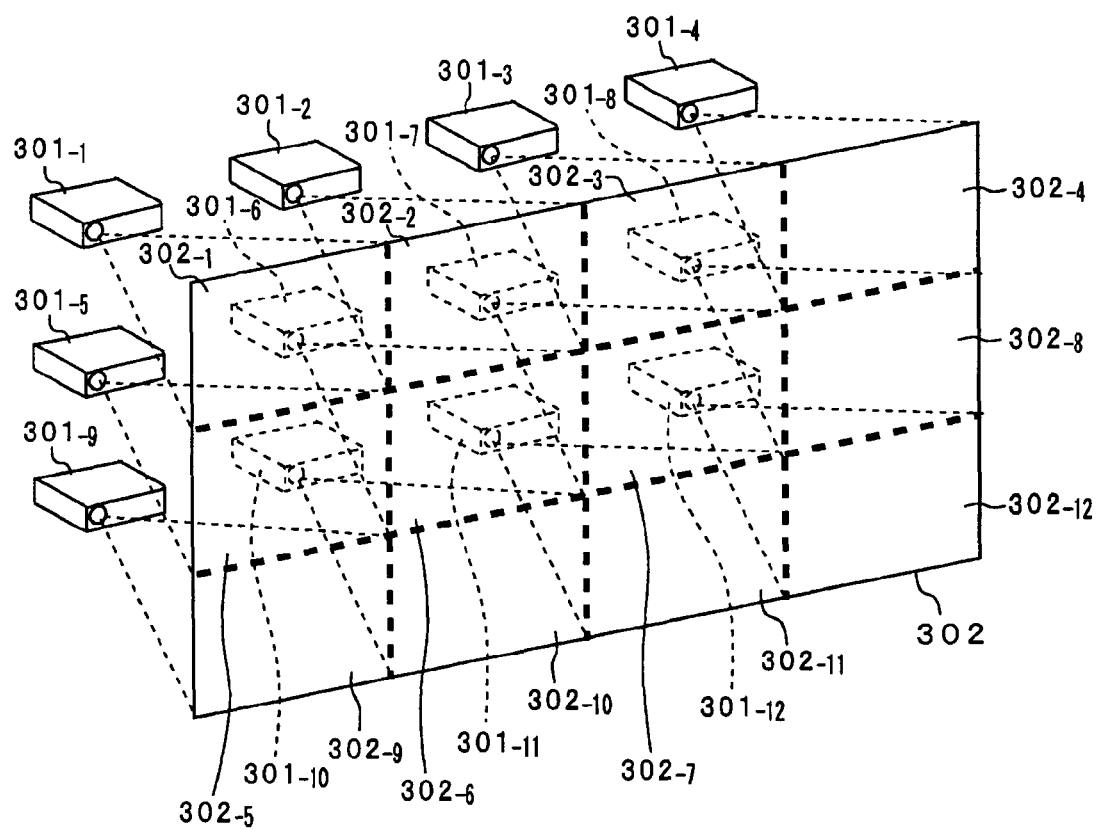
FIG. 3 is a diagram for showing a relationship between each of the projectors and their corresponding section of the projection image.
Figure 4:
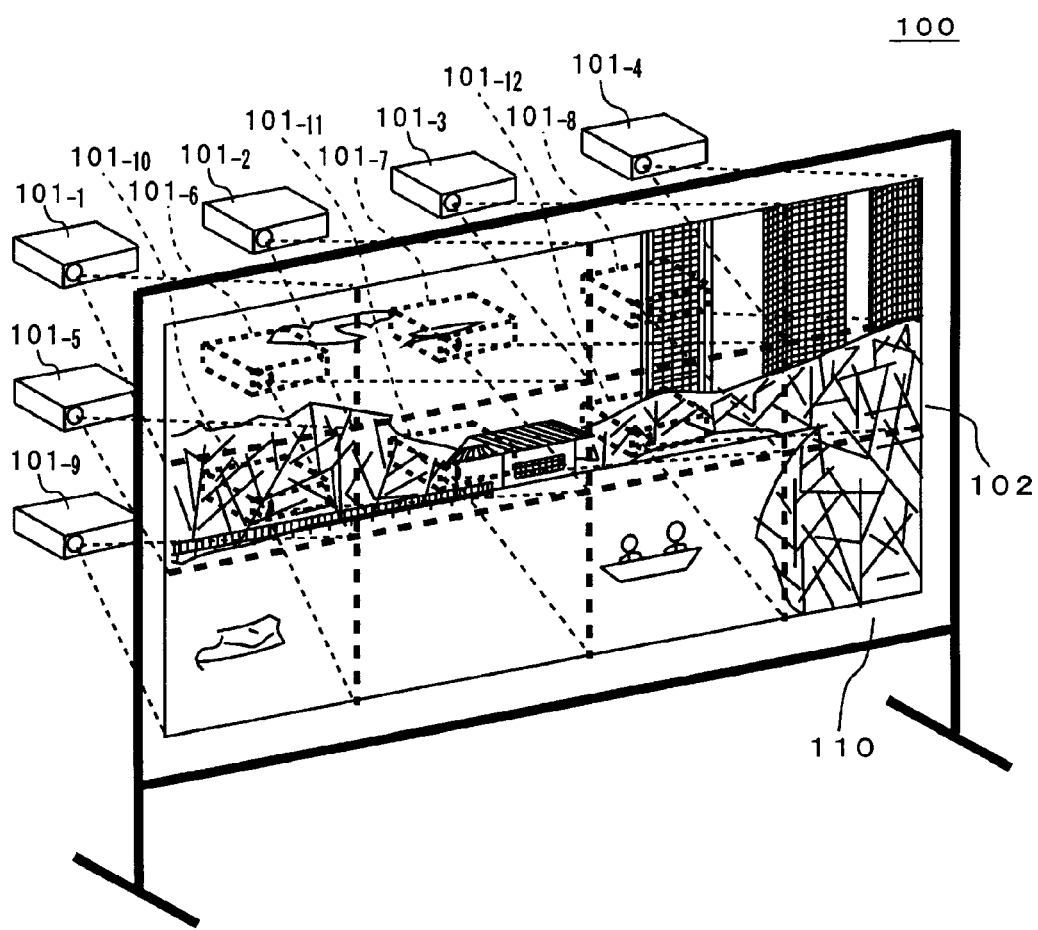
FIG. 4 is a schematic view of an embodiment of a multi-projection system according to the invention.

The following will describe preferred embodiments according to the invention. FIG. 4 is a schematic view of a multi-projection system (apparatus that presents a projection image) 100 as an embodiment of the invention.

This multi-projection system 100 is constituted of a total of 12 projectors $101_{-1}$ to $101_{-12}$ arranged in a matrix of four projectors per row and three per column.

Figure 5:
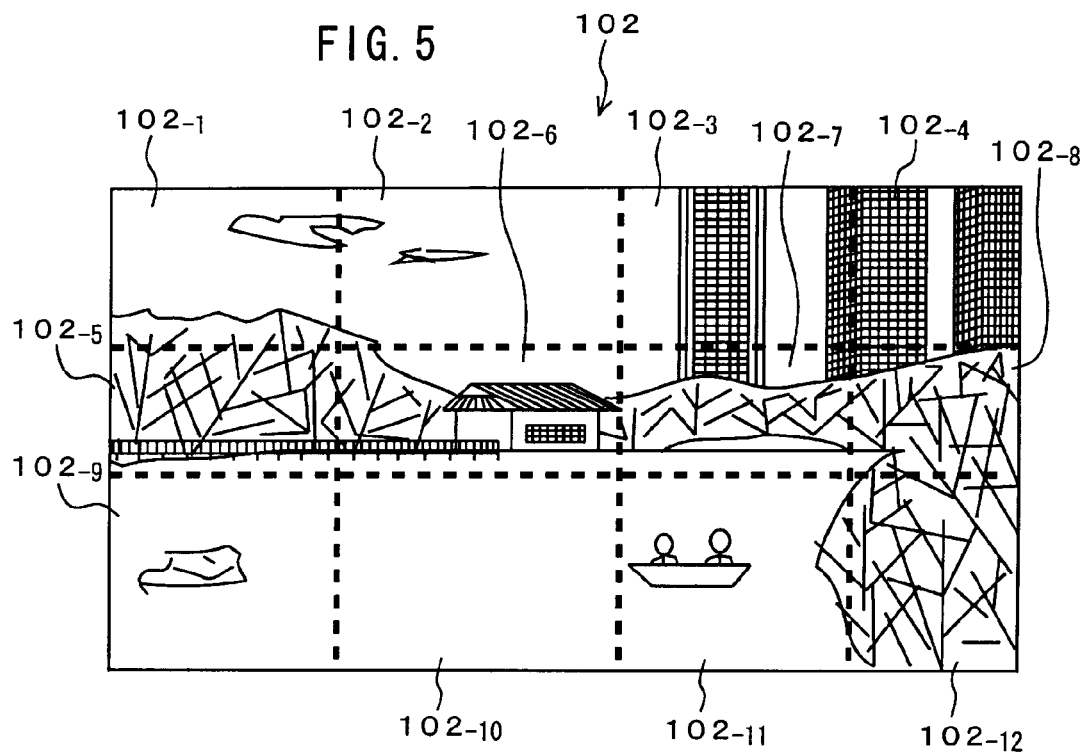
FIG. 5 is a diagram for showing a projection image and its sections projected by the corresponding projectors.

FIG. 5 shows an example of a projection image 102 that these 12 projectors $101_{-1}$ to $101_{-12}$ project onto a screen 110. This projection image 102 is divided into 12 sections $102_{-1}$ to $102_{-12}$, and each section is an image section (projected section) that is projected onto the screen 110 by each of the respective projectors. In FIG. 5, broken lines represent the boundaries between adjacent sections among the 12 projected sections $102_{-1}$ to $102_{-12}$.

In this embodiment, these 12 projected sections $102_{-1}$ to $102_{-12}$ are determined on the basis of input image signal(s), which will be described later. In this case, the projected section to be projected by each projector is determined such that the number of projectors assigned to a section containing a large amount of information per unit area of the projection image 102 is increased while the number of projectors assigned to a section containing a small amount of information per unit area of the projection image 102 is decreased.

Figure 6:
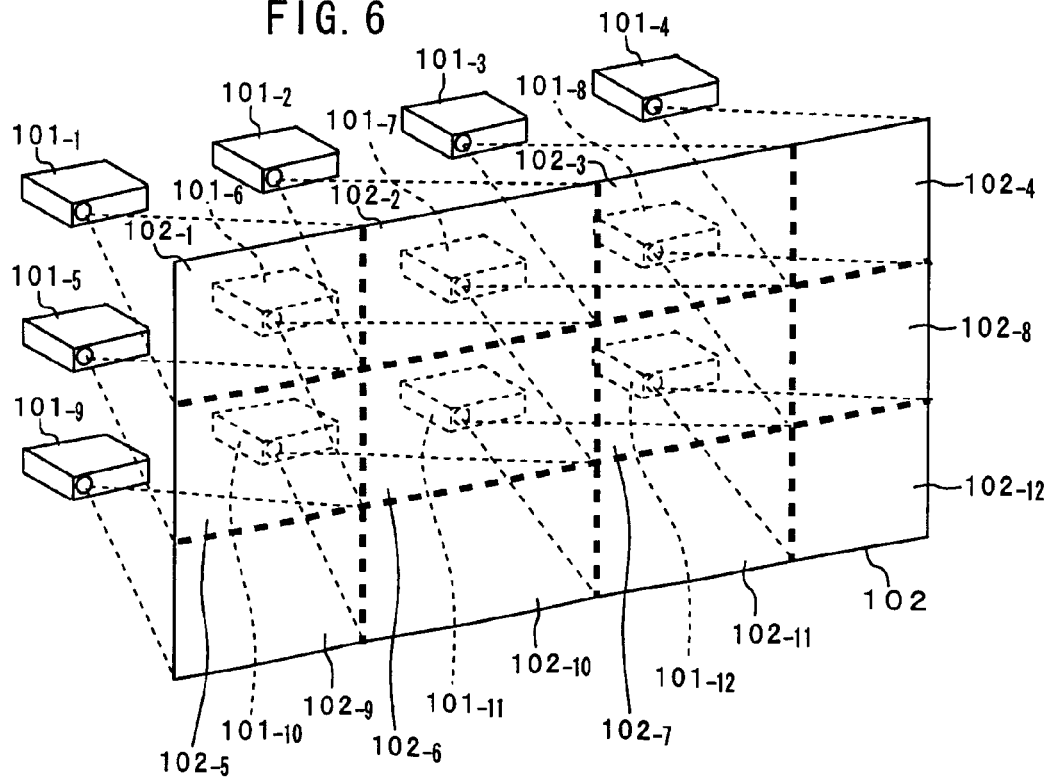
FIG. 6 is a diagram for showing a relationship between each of the projectors and their corresponding section of the projection image.

FIG. 6 clearly shows a relationship between each of the projectors $101_{-1}$ to $101_{-12}$ and their corresponding projected sections $102_{-1}$ to $102_{-12}$ of the projection image in which the displayed projection image will be omitted from each of the sections. It is to be noted that slightly overlapping parts (blending regions) practically exist between the adjacent projected sections that are projected by the adjacent projectors but these overlapping parts will be omitted herein to simplify the description here.

Figure 7A:
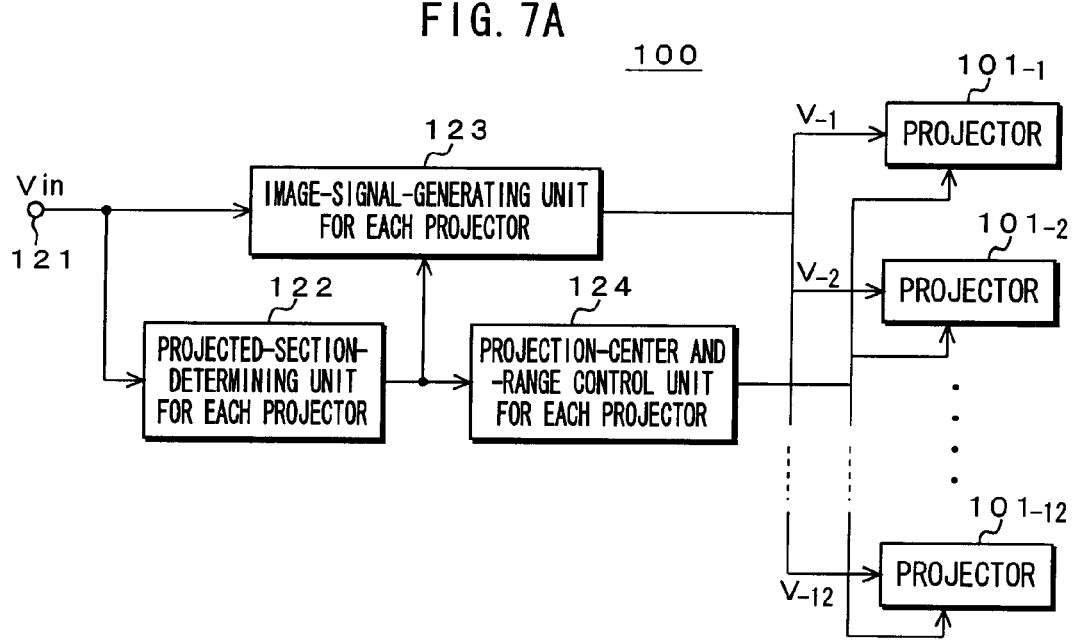
FIG. 7A is a block diagram for showing a configuration of the multi-projection system.

FIG. 7 shows a configuration of the multi-projection system 100. This multi-projection system 100 contains an input terminal 121, a projected-section-determining unit 122, an image-signal-generating unit 123, and a projection-center and -range control unit 124.

The input terminal 121 is used for allowing an image signal Vin suitable for the projection image 102 to be input (referred to FIG. 5). Here, if the projectors $101_{-1}$ to $101_{-12}$ are constituted of display devices such as liquid crystal displays (LCDs) and if each LCD includes Nh pixels (for example, 1024 pixels) per row and Nv pixels (for example, 768 pixels) per column, then the input image signal Vin contains, for example, pixel signals that are compatible with a matrix of pixels of Nx×Ny, where Nx is larger than 4Nh in the horizontal direction thereof, and Ny is larger than 3Nv in the vertical direction thereof.

Figure 7B:
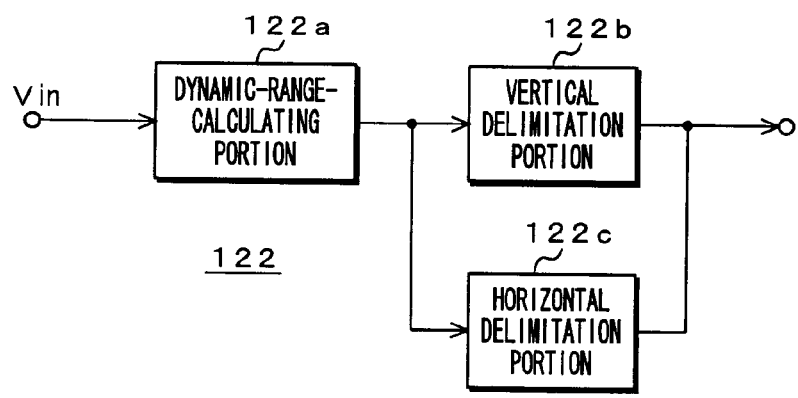
FIG. 7B is a block diagram for showing a configuration of the projected-section-determining unit.

The projected-section-determining unit 122 contains a dynamic-range-calculating portion 122a, a vertical delimitation portion 122b, and a horizontal delimitation portion 122c (refer to FIG. 7B). The projected-section-determining unit 122 determines a section (a projected section) of the projection image 102 to be projected onto the screen 110 by each of the projectors $101_{-1}$ to $101_{-12}$ on the basis of the image signal Vin received through the input terminal 121 (refer to FIG. 4). How to determine the projected section(s) by the projected-section-determining unit 122 will be described later.

The image-signal-generating unit 123 generates image signals $V_{-1}$ to $V_{-12}$ that correspond to the sections of the projection image to be projected onto the screen 110 by the respective projectors $101_{-1}$ to $101_{-12}$, on the basis of the image signal Vin received through the input terminal 121 and the projected sections to be projected by the respective projectors $101_{-1}$ to $101_{-12}$, which sections are determined by the projected-section-determining unit 122. The image signals $V_{-1}$ to $V_{-12}$ generated by the image-signal-generating unit 123 are respectively supplied to the projectors $101_{-1}$ to $101_{-12}$. The projectors $101_{-1}$ to $101_{-12}$ receive, respectively, the image signals $V_{-1}$ to $V_{-12}$ thus supplied and project the projection image.

The following will describe a method that generates the image signals by the image-signal-generating unit 123 with reference to FIGS. 8A and 8B, where each "o" represents a pixel.

As shown in FIG. 8A, the numbers of pixels on the input image signal Vin are obtained by multiplying Nx in the horizontal direction and Ny in the vertical direction, so there are Ny (=vm+1) horizontal lines from 0 to vm, and there are Nx (=hm+1) vertical lines from 0 to hm.

Suppose that the above projected-section-determining unit 122 determines vertical lines X1, X2 and X3 as the horizontal section boundaries and horizontal lines Y1 and Y2 as the vertical section boundaries. In this moment, the projection image 102 to be projected by the projectors $101_{-1}$ to $101_{-12}$ is divided into the projected sections $102_{-1}$ to $102_{-12}$ thereof, as shown in FIG. 8A, by the horizontal lines Y1 and Y2 and the vertical lines X1, X2 and X3.

In the image-signal-generating unit 123, the pixel signals for, for example, for 1,024×768 pixels, constituting each of the image signals $V_{-1}$ to $V_{-12}$ to be respectively supplied to the projectors $101_{-1}$ to $101_{-12}$ are produced by using any well-known interpolation process from the pixel signals in the input image signal Vin for the pixels included in the projected sections $102_{-1}$ to $102_{-12}$, respectively, as shown in FIG. 8B. For example, as for the image signal $V_{-1}$ to be supplied to the projector $101_{-1}$, the pixel signals for 1,024×768 pixels are produced from the pixel signals in the input image signal Vin for the (X1+1)×(Y1+1) pixels included in the projected section 102-1.

The projection-center and -range control unit 124 controls the projectors $101_{-1}$ to $101_{-12}$ to adjust their projection centers and projection ranges on the basis of the projected sections $102_{-1}$ to $102_{-12}$ to be projected by the respective projectors $101_{-1}$ to $101_{-12}$, which sections are determined by the projected-section-determining unit 122. In this case, the respective projectors $101_{-1}$ to $101_{-12}$ are controlled so that the sections $102_{-1}$ to $102_{-12}$ of the projection image 102 projected by the projectors $101_{-1}$ to $101_{-12}$ based on the above image signals $V_{-1}$ to $V_{-12}$ can be respectively projected to their proper positions (their projection centers with their projection ranges) on the screen 110, which positions correspond to the projected sections $102_{-1}$ to $102_{-12}$ of the projection image 102 to be projected by the respective projectors $101_{-1}$ to $101_{-12}$, described above.

Figure 9:
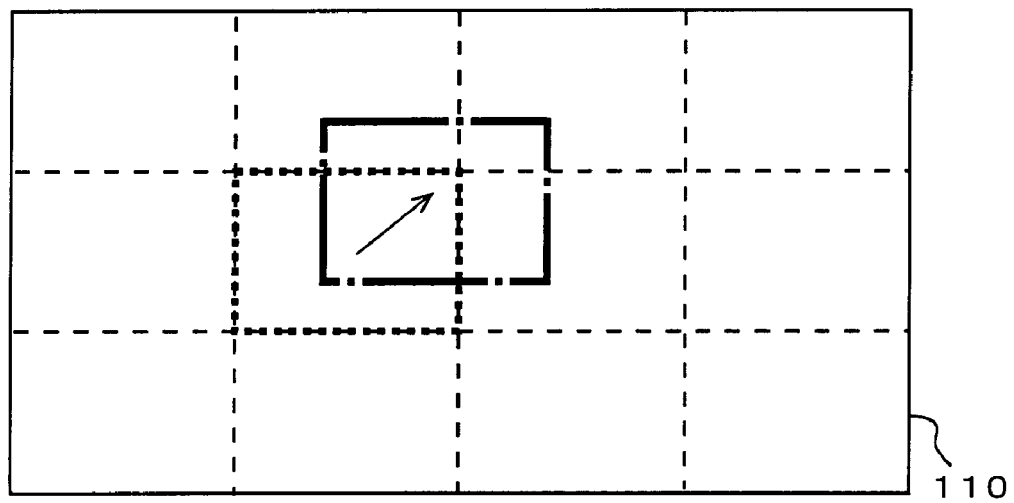
FIG. 9 is a diagram for describing a displacement of a center of projection.
Figure 10:
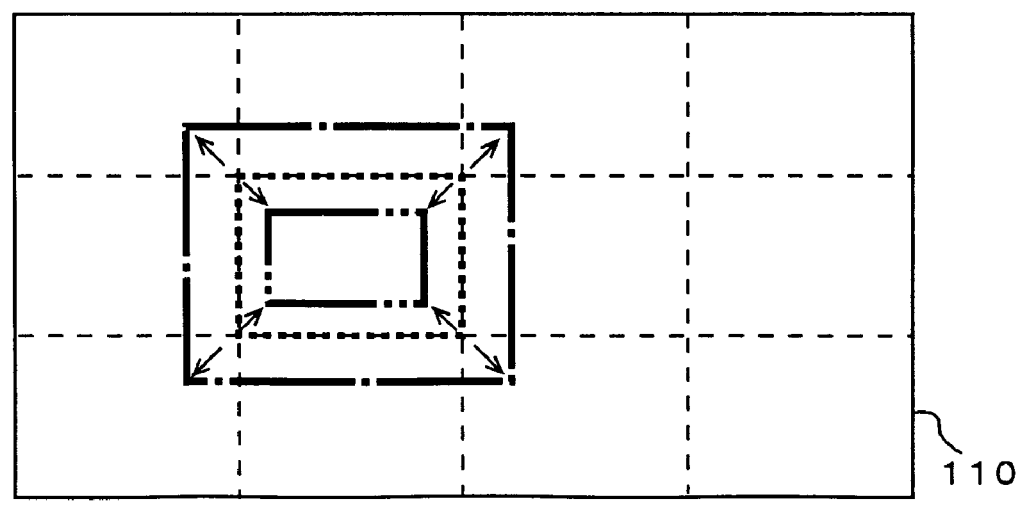
FIG. 10 is a diagram for describing a change in the projection range.

FIG. 9 shows an example in which a projection center of a projected section of the projection image is shifted in the screen 110 from a position indicated in broken lines to a position indicated in alternate long and short dash lines. In addition, FIG. 10 shows an example in which a projection range of a projected section of the projection image is changed from a range indicated in broken lines to that indicated in alternate long and short dash lines, or from a range indicated in broken lines to that indicated in alternate long and two short dash lines on the screen 110.

A lens-shift mechanism, which is provided to a well-known projector, or a mechanism using a mirror shifts the projection center thereof.

Figure 11A:
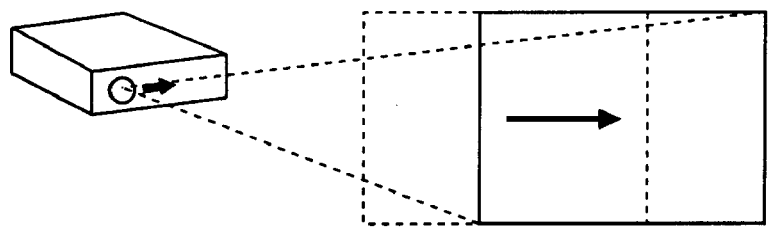
FIGS. 11A and 11B are diagrams each for describing a displacement of the center of the projection by a lens-shift mechanism.
Figure 11B:
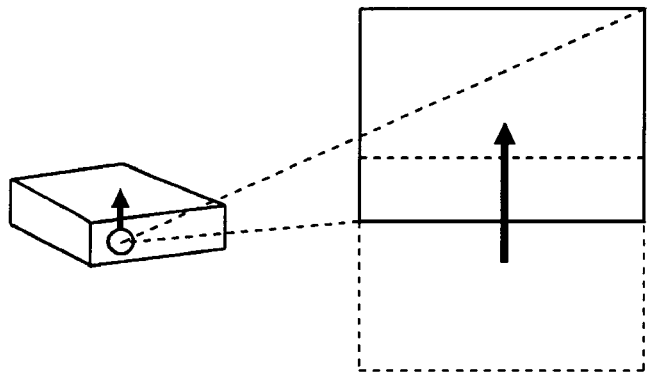

FIGS. 11A and 11B respectively show a displacement of the projection center by the lens-shift mechanism. Shifting the lens horizontally enables the projection center to be shifted in the horizontal direction, as shown in FIG. 11A. Also, shifting the lens vertically enables the projection center to be shifted in the vertical direction, as shown in FIG. 11B. If such a lens-shift mechanism is adopted, then the projection-center and -range control unit 124 controls the projectors $101_{-1}$ to $101_{-12}$ to adjust their lens-shift mechanism so that the lens is shifted only by the distance that corresponds to the information of projection-center shift, either horizontally or vertically, or in both of the directions.

Figure 12:
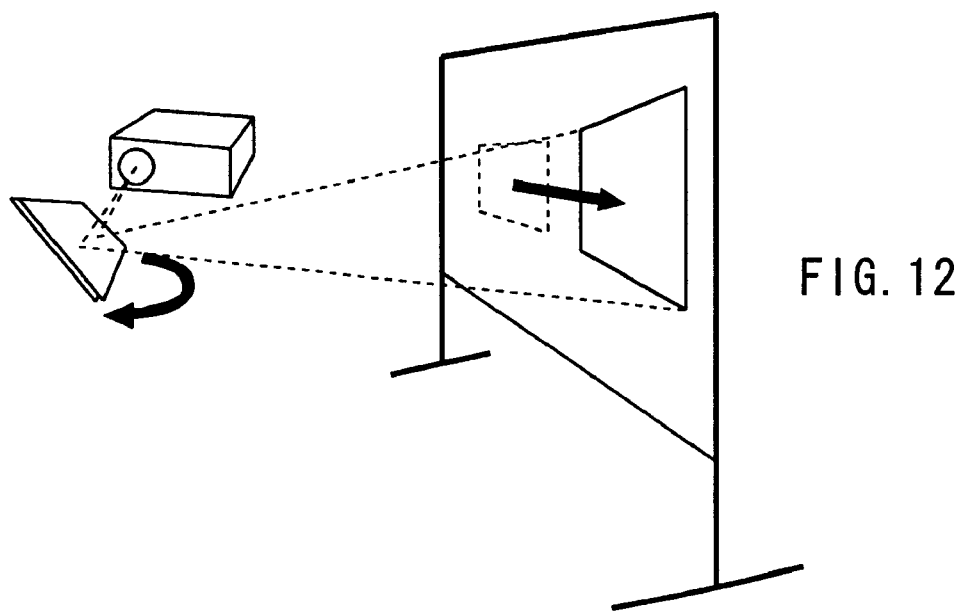
FIG. 12 is a diagram for describing a displacement of the center of the projection by a mechanism incorporating a mirror.

In addition, FIG. 12 shows a shift of a projection center by a mechanism using a mirror. Rotating the mirror horizontally or vertically enables the projection center to be shifted in the horizontal or vertical direction, respectively. If such a mechanism using a mirror is adopted, then the projection-center and -range control unit 124 controls the projectors $101_{-1}$ to $101_{-12}$ to adjust their mechanism using the mirror so that the mirror can be rotated, either horizontally or vertically, or both horizontally and vertically, exactly by the angular degree that corresponds to the information on projection-center shift.

Figure 13A:
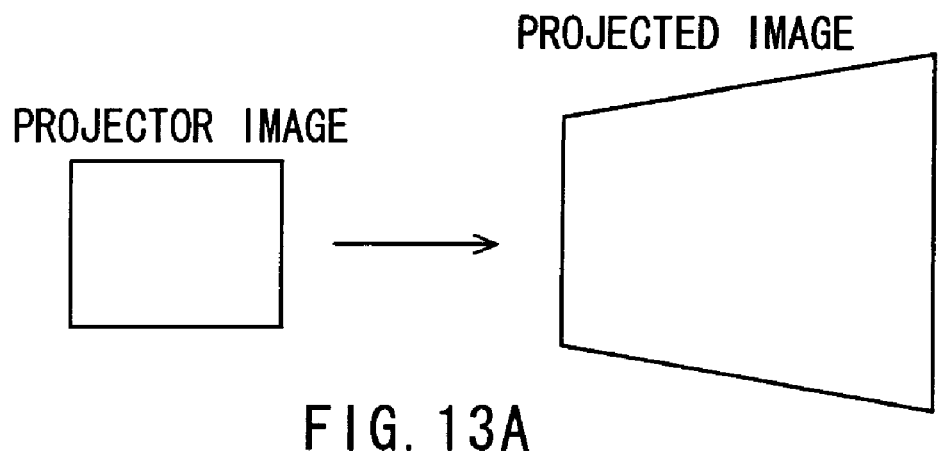
FIGS. 13A and 13B are diagrams each for describing image distortion and a process for canceling it.
Figure 13B:
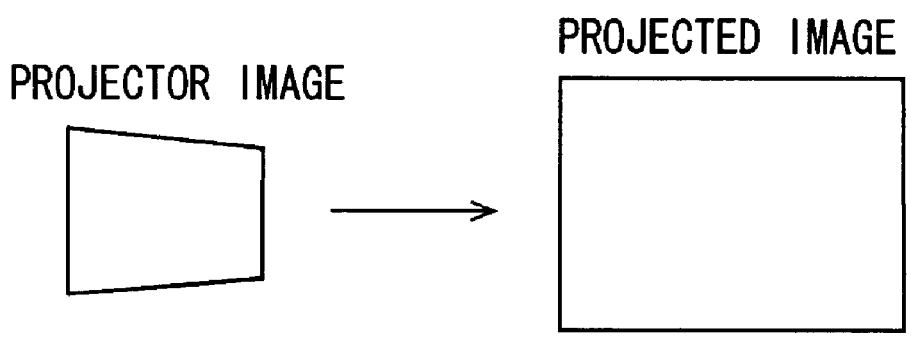

However, in the shift of the projection center by such a mechanism using a mirror, if the image (projector image) obtained by the projector is shown as a rectangle, then the image (projected image) projected on the screen 110 can become distorted and come to be trapezoidal as shown in FIG. 13A. In this case, as shown in FIG. 13B, the image is processed for the shift of the projection center such that the projector image is made trapezoidal to offset the resultant distortion. As a result, the projected sections of the projection image that are projected onto the screen 110 respectively come to be rectangular without any distortion.

The projection range can be changed by an aspect-ratio change mechanism or the like using a zoom mechanism and a cylindrical mirror or a cylindrical lens. The projection-center and range control unit 124 controls the projectors 101$_{-1}$ to 101$_{-12}$ to adjust their zoom ratio and their aspect ratio in correspondence to the information on the projection range. As shown in FIG. 14, by adjusting the zoom ratio and the aspect ratio in combination, any projection range can be achieved optionally. In this moment, the size of the projection range is determined by the zoom ratio while the shape of the projection range is determined by the aspect ratio.

The aspect-ratio change mechanism uses, for example, a cylindrical mirror. In this mechanism, the aspect ratio is changed by changing the curvature of the cylindrical mirror. Also, the aspect-ratio change mechanism may use, for example, a plurality of cylindrical lenses for achieving aspect ratio changes. In this mechanism, the aspect ratio is changed by changing the cylindrical lens being used.

The following will describe methods that determine the projected sections by the projected-section-determining unit 122. Here, two methods, i.e., a first method and a second method, will be described.

"Description of the First Method"

At first, a local dynamic range (local DR) is calculated for every pixel, by using the signal for a target pixel and the signals for a predetermined number of pixels adjacent to the target pixel on the basis of the input image signals Vin. For example, as shown in FIG. 15, by using the signal (pixel signal) for the target pixel P0 and the signals (pixel signals) of eight pixels P1 to P8 adjacent to the target pixel P0, the difference (MAX−MIN) between the minimum MIN and the maximum MAX is taken as the local DR. In this sense, the projected-section-determining unit 122 contains the dynamic range calculation portion 122$a$ (see FIG. 7B).

The sum total S of the local DRs for all the pixels over the whole image is then calculated. For example, for the image shown in FIG. 16A, the sum total S is calculated as shown in FIG. 16B.

Next, vertical section boundaries are delimited by every horizontal line where the accumulated sum of the local DRs comes to be equal to a quotient of the sum total S of the local DRs for all the pixels divided by the number of projectors per column, 3 in this embodiment. For example, for an image shown in FIG. 17A, vertical section boundaries Y1, Y2 are delimited by every horizontal line where the accumulated sum of the local DRs becomes S/3 (see FIG. 17B). In this sense, the projected-section-determining unit 122 contains the vertical delimitation portion 122$b$ (see FIG. 7B).

Further, horizontal section boundaries are delimited by every vertical line where the accumulated sum of the local DRs comes to be equal to a quotient of the sum total S of the local DRs for all the pixels divided by the number of projectors per row, 4 in this embodiment. In this sense, the projected-section-determining unit 122 contains the horizontal delimitation portion 122$c$ (see FIG. 7B).

As described above, the section boundaries in the horizontal direction and in the vertical direction are delimited for partitioning the projection image into the sections (projected sections) 102$_{-1}$ to 102$_{-12}$ thereof to be projected onto the screen 110 by the projectors 101$_{-1}$ to 101$_{-12}$, respectively. In the sections 102$_{-1}$ to 102$_{-12}$ of the projection image 102 to be projected by the projectors 101$_{-1}$ to 101$_{-12}$, respectively, which sections are partitioned by the horizontal and vertical section boundaries determined in the above-described way, the sum total of the local DRs for all the sections is approximately equal. In other words, the projected-section-determining unit 122 determines the horizontal or vertical section boundaries such that the sum total of the local DRs for all sections 102$_{-1}$ to 102$_{-12}$ of the projection image 102 to be projected by the projectors 101$_{-1}$ to 101$_{-12}$ can be equal.

Figure 18:
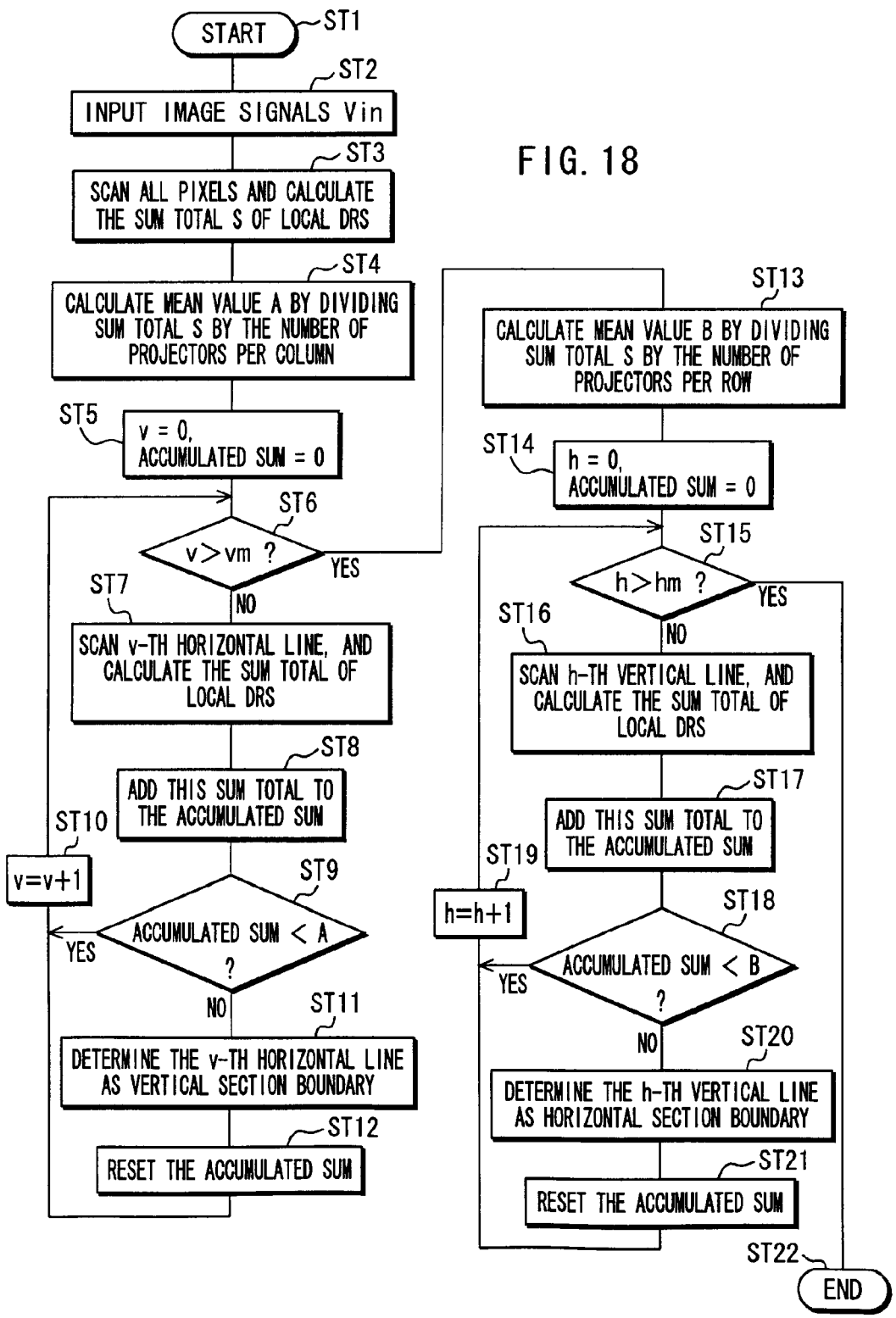
FIG. 18 is a flowchart for showing steps of determining the section of the projection image to be projected by each of the projectors (first method)

FIG. 18 shows a flowchart for showing operations of determining the projected sections carried out according to the above first method.

At first, the determination operation starts at step ST1, and the image signal Vin for one frame is input at step ST2. Then, the whole image, i.e., all the pixels, is scanned to calculate the sum total S of the local DRs for all the pixels at step ST3.

Next, at step ST4, the mean value A is calculated by dividing the sum total S by the number of projectors per column. At step ST5, v, which represents the line number, of the horizontal lines, is set to 0, and the accumulated sum is reset to 0.

Next, at step ST6, it is determined whether or not the line number v is greater than the maximum line number vm, i.e., v>vm. If not v>vm, then the operation proceeds to step ST7. At the step ST7, the v-th horizontal line is scanned, and the sum total of the local DRs for this particular line is calculated. At step ST8, the sum total calculated at the step ST7 is added to the accumulated sum.

Next, at step ST9, it is determined whether or not the accumulated sum is smaller than the mean value A calculated at step ST4. If the accumulated sum is smaller than the mean value A, then the line number v is incremented by one at step ST10 and the operation returns to the step ST6. By this returning, the same operations are taken on the next horizontal line. In other words, the sum total of the local DRs for this new line is calculated, this sum total is added to the accumulated sum, and whether this accumulated sum is smaller than the mean value A is determined.

At the step ST9, if the accumulated sum is equal or larger than the mean value A, then the operation proceeds to step ST11. At the step ST11, the v-th horizontal line is determined as a vertical section boundary. Then, at step ST12, the accumulated sum is reset to 0, and at the step ST10, the line number v is incremented by one. After that, the operation returns to the step ST6. By this returning, the same operations are taken for determining next vertical section boundary.

If v>vm at step ST6, then this condition means that all the vertical section boundaries have been determined, so the operation proceeds to step ST13 where operations will be taken for determining the horizontal section boundaries. At the step ST13, the mean value B is calculated by dividing the sum total S by the number of projectors per row. Then, at step ST14, h, which represents the line number of the vertical lines, is set to 0, and the accumulated sum is reset to 0.

Next, at step ST15, it is determined whether or not the line number h is larger than the maximum line number hm, i.e., h>hm. If not h>hm, then the operation proceeds to step ST16. At the step ST16, the h-th vertical line is scanned, and the sum total of the local DRs for this line is calculated. At step ST17, the sum total calculated at the step ST16 is added to the accumulated sum.

Next, at step ST18, it is a determined whether or not the accumulated sum is smaller than the mean value B calculated at the step ST13. If the accumulated sum is smaller than the mean B, then, at step ST19, the line number h is incremented by one. After that, the operation returns to the step ST15. By this returning, the same operations are taken on a next vertical line. In other words, the sum total of the local DRs for this new line is calculated, this sum total is added to the accumulated sum, and whether this accumulated sum is smaller than the mean value B is determined.

At the step ST18, if the accumulated sum is equal or larger than the mean value B, then the operation proceeds to step ST20 where the h-th vertical line is determined as a horizontal section boundary. Then, at step ST21, the accumulated sum is reset to 0, and at the step ST19, the line number h is incremented by one. After that, the operation returns to the step ST15. By this returning, the same operations are taken for determining next horizontal section boundary.

If h>hm at the step ST15, then this condition means that all the horizontal section boundaries have been just determined. Therefore, the operation proceeds to step ST22 where the operations terminate.

By executing the operations in the flowchart shown in FIG. 18, the vertical and horizontal section boundaries can be determined and thus, the sections $102_{-1}$ to $102_{-12}$ of the projection image 102 to be projected by the respective projectors $101_{-1}$ to $101_{-12}$ are determined as described above.

Figure 19:
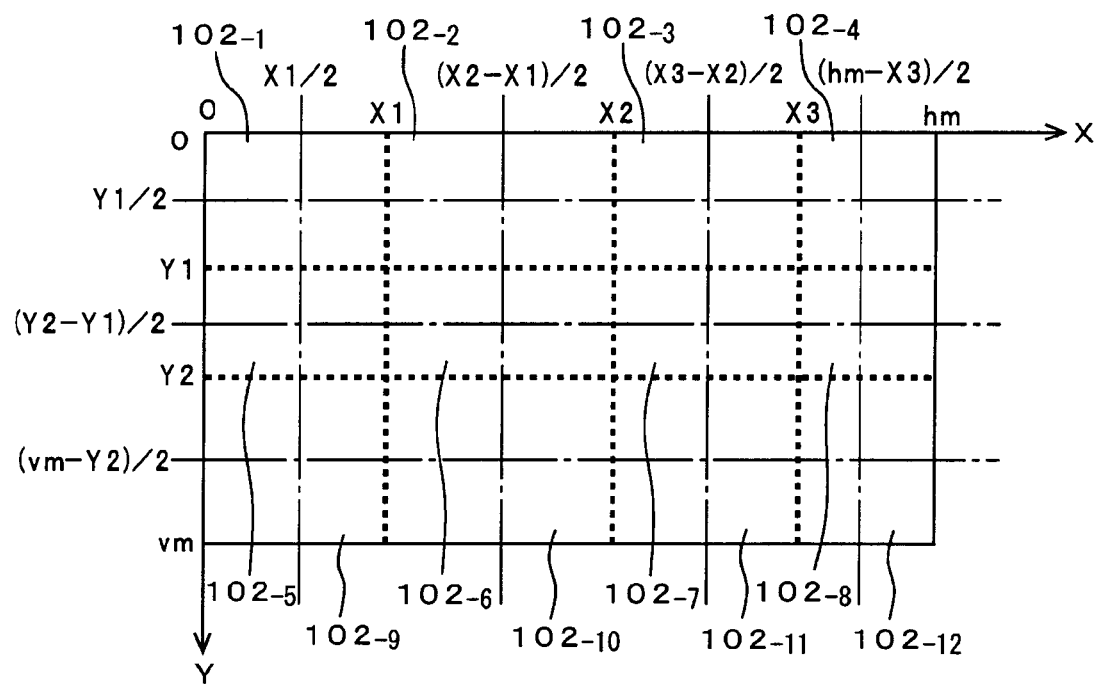
FIG. 19 is a diagram for describing the information on the centers and ranges of the projection by each projector.

FIG. 19 shows information of the projection centers and projection ranges for a case where a total of 12 projectors $101_{-1}$ to $101_{-12}$ are arranged in a matrix of four projectors per row and three per column as shown in FIG. 4. In this case, the information of the projection ranges by the projectors $101_{-1}$ to $101_{-12}$ includes the horizontal section boundaries X1, X2 and X3 and the vertical section boundaries Y1 and Y2. In addition, the information of the projection centers by the projectors $101_{-1}$ to $101_{-12}$ includes X1/2, (X2−X1)/2, (X3−X2)/2 and (hm−X3)/2, and Y1/2, (Y2−Y1)/2 and (vm−Y2)/2.

"Description of the Second Method"

The following will describe a determination of the horizontal section boundaries.

Figure 20:
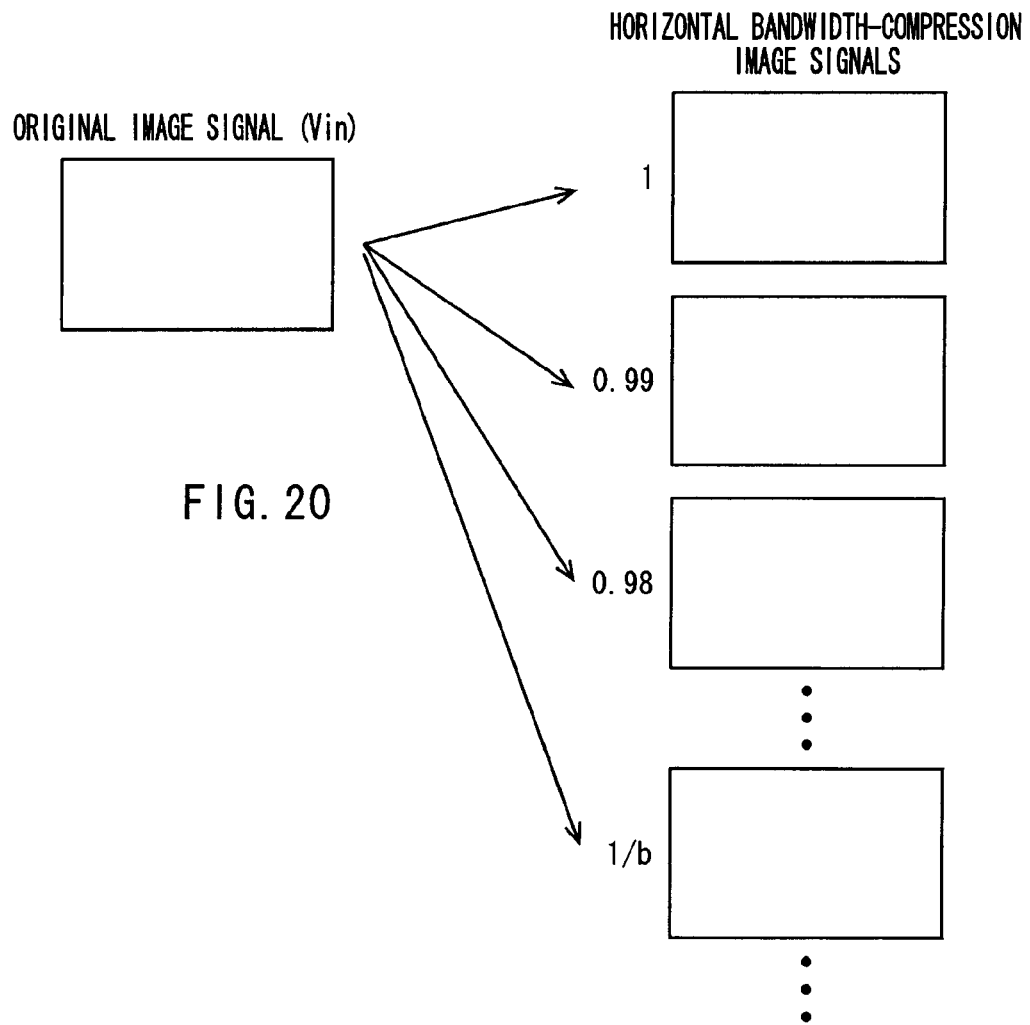
FIG. 20 is a diagram for describing generation of bandwidth-compression image signals that are used to determine the section of projection image to be projected by each projector.
Figure 21:
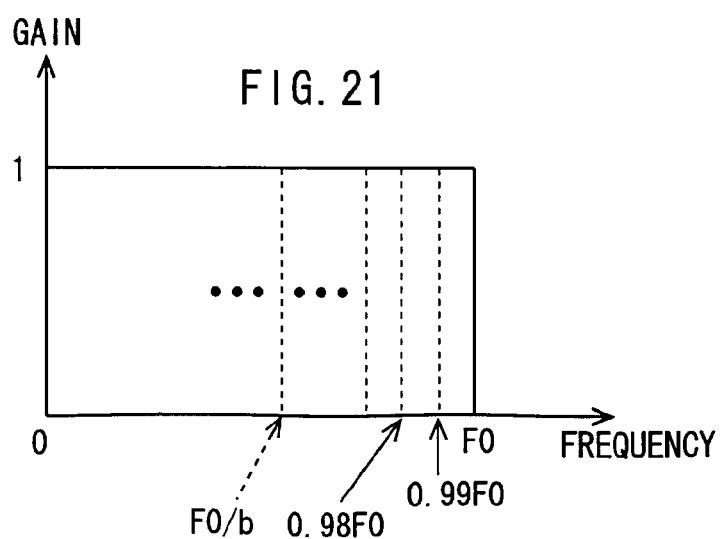
FIG. 21 is a diagram for showing a property of a horizontal low pass filter (LPF) for generating horizontal bandwidth-compression image signals.

At first, input image signal Vin is taken as an original image signal, and horizontal bandwidth-compression image signals at a compression factor 1/b are generated on the basis of the original image signal as shown in FIG. 20. Here, for the 1/b, values are taken at 0.01 steps, for example, 1, 0.99, 0.98, . . . , or they can be at even smaller steps. For the generation of the bandwidth-compression image signals at the 1/b, the horizontal frequency bandwidth of the original image signal is limited by a horizontal low pass filter (LPF) that limits the horizontal bandwidth to F0/b where the horizontal frequency bandwidth of the original image signals is taken as F0 as shown in FIG. 21.

Next, the amount of image information is calculated for each vertical strip, which abuts one another horizontally.

Figure 22:
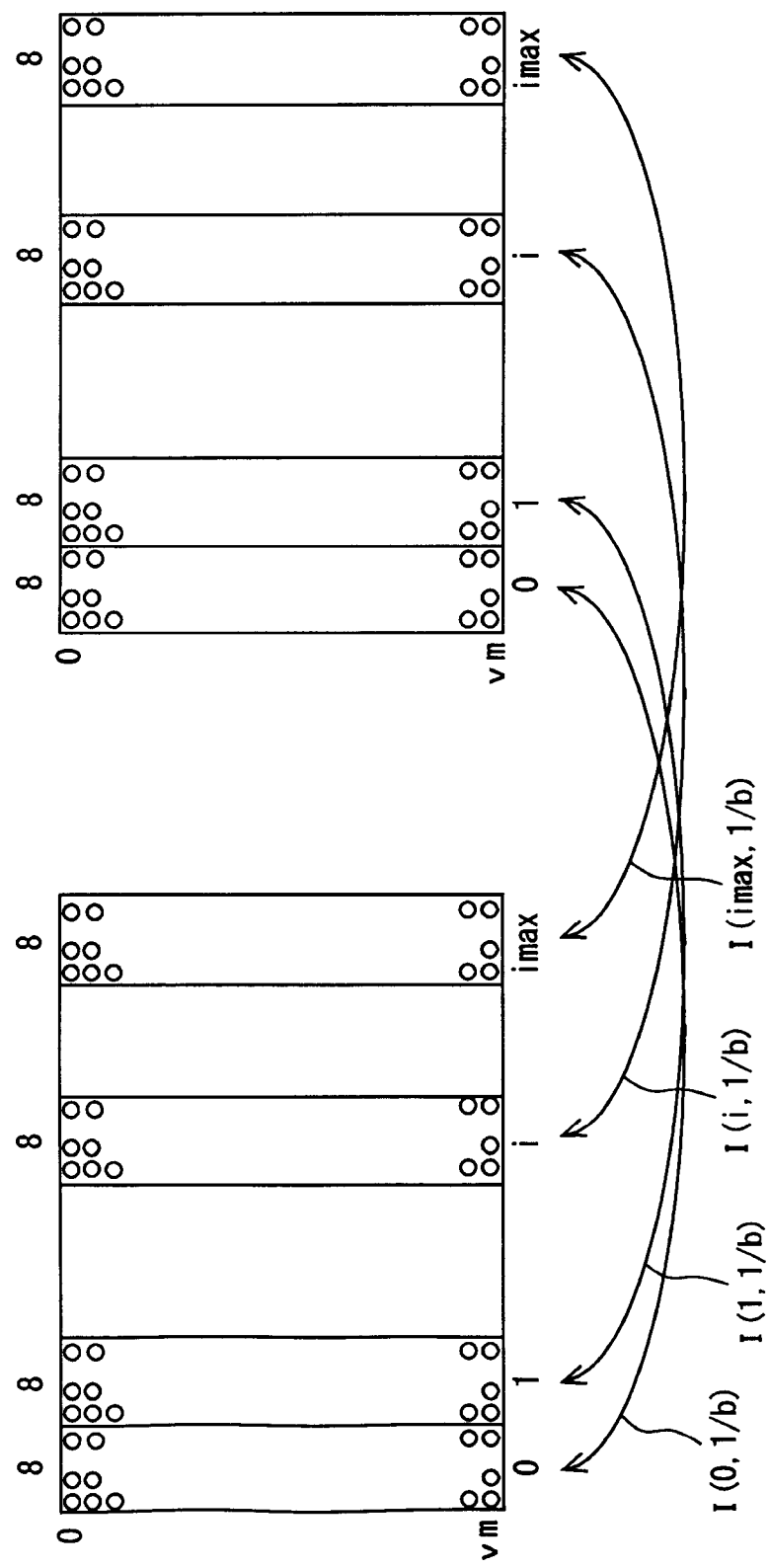
FIG. 22 is a diagram for describing generation of a remainder for each of the strips.

In other words, as shown in FIG. 22, the original image signal (Vin) and the horizontal bandwidth-compression image signals at the 1/b, respectively, are paired one with the other, having, for example, eight-pixel width vertical strips, which are numbered as 0 to imax. Then, the differences between the pairs of pixels in each of the strips 0 to imax for the original image signals (Vin) and the corresponding strip for the horizontal bandwidth-compression image signals at the 1/b are calculated. Then, the sum total of the absolute values of the differences is calculated to generate a remainder I(0, 1/b) to I(imax, 1/b) for each of the strips 0 to imax. In this case, the number of pixels included in each of the strips is 8×vm, so the remainder I(i, 1/b) is the sum total of the absolute values of the differences for the 8×vm pixels. In addition, the remainder I(0, 1/b) to I(imax, 1/b) for each of the strips 0 to imax is generated at each value of the 1/b.

Figure 24:
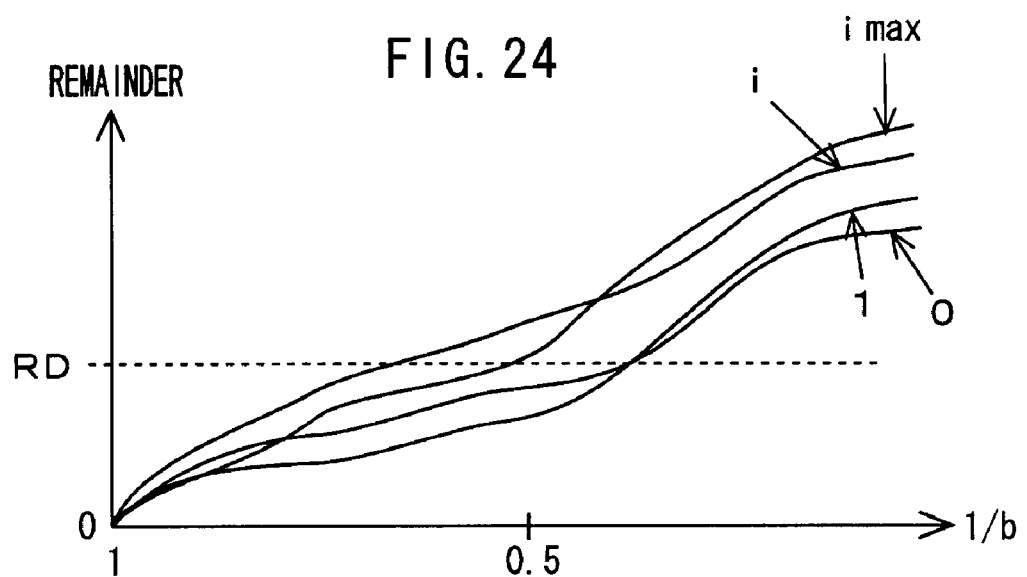
FIG. 24 is a graph for showing a relationship between values of the remainder and those of the compression factor 1/b for the respective strips.

Then, a relationship between the remainder for each of the strips 0 to imax and the 1/b is defined by using the remainder I(0, 1/b) to I(imax, 1/b) for each of the strips 0 to imax, which is generated at each value of the 1/b, as shown in FIGS. 23A to 23D. FIG. 24 shows these relationships together.

Figure 25:
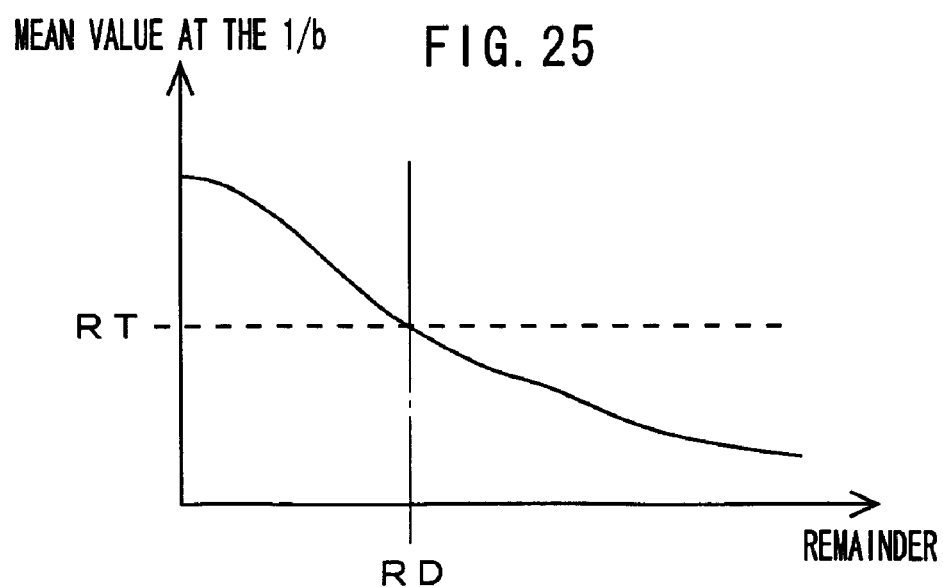
FIG. 25 is a graph for showing a relationship between the mean value of the compression factor 1/b for each of the strips and the remainder at each value of the remainder.

From the relationship between the 1/b and the remainder for each of the strips 0 to imax generated at each value of the 1/b, the mean value of the 1/b is calculated for each of the strips 0 to imax that correspond to the values of the respective remainders, and a relationship is defined between the remainder and the mean value of the compression factor 1/b as shown in FIG. 25. From this relationship between the remainder and the mean value of the 1/b, an applied remainder is determined.

In this moment, if the input image signal Vin includes pixel signals corresponding to the Nx×Ny pixels as described above, where Nx is larger than 4Nh (Nh being the number of pixels per row of a projector) in the horizontal direction, and Ny is larger than 3Nv (Nv being the number of pixels per column of the projector) in the vertical direction, as shown in FIG. 25, the remainder RD that corresponds to the horizontal pixel number compression ratio RT=4Nh/Nx is determined as the above applied remainder.

Figure 27:
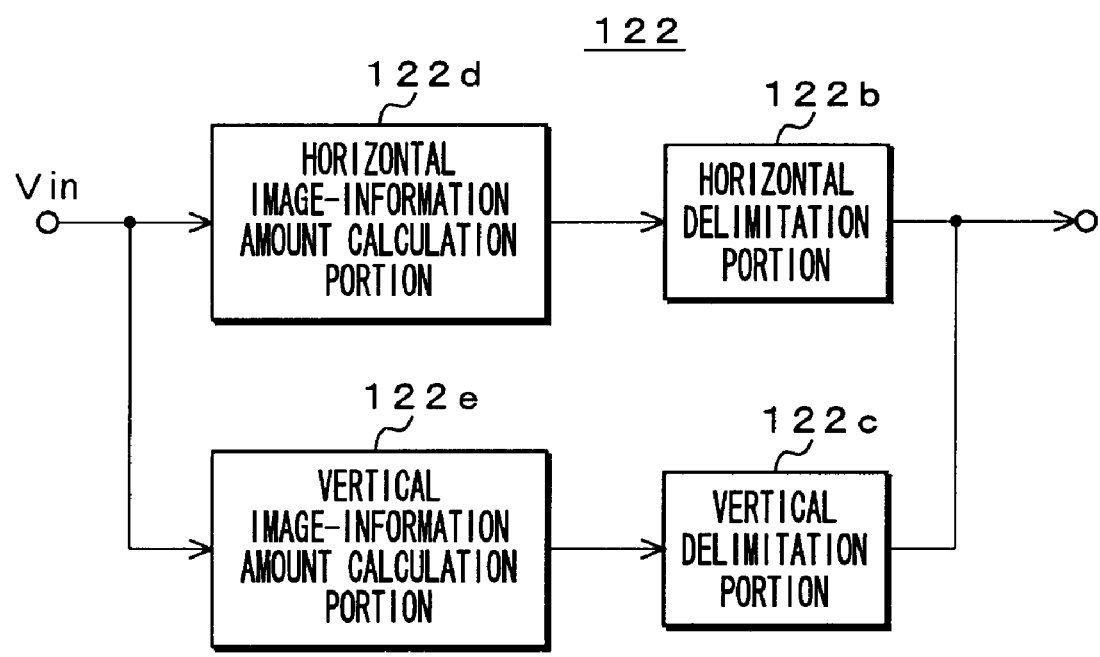
FIG. 27 is a block diagram for showing a configuration of another projected-section-determining unit.

From the relationship between the remainder and the 1/b for each of the strips 0 to imax shown in FIGS. 23A to 23D and FIG. 24, the compression factor 1/b (e0 to eimax) that corresponds to the applied remainder RD for each of the strips 0 to imax is calculated. Therefore, each compression factor e0 to eimax corresponds to the amount of image information for its respective strips 0 to imax in the input image signal Vin. In this sense, the projected-section-determining unit 122 contains a first image-information amount calculation portion 122d (see FIG. 27) that calculates the amount of image information for each vertical strip, which abuts one another in the horizontal direction.

In this case, the compression factor 1/b is made smaller for a strip located in projection image in which a small amount of information (flat places with few details, for example, cloudless sky) is contained while the compression factor 1/b is made larger for a strip located in projection image in which a large amount of information (places with fine details, for example, trees, buildings and structures) is contained. Therefore, calculating the compression factor e0 to eimax for each of the vertical strips 0 to imax as described above is equivalent to calculating the amount of image information for each of the vertical strips.

Next, on the basis of the compression factors e0 to eimax of the vertical strips 0 to imax, a horizontal section boundary is delimited by every vertical line where the accumulated sum of the amounts of image information comes to equal to a quotient of the sum total of the amounts of image information for all the vertical strips divided by the number of projectors per row, 4 in this embodiment. In this sense, the projected-section-determining unit 122 contains the horizontal delimitation portion 122b (see FIG. 27).

Figure 26:
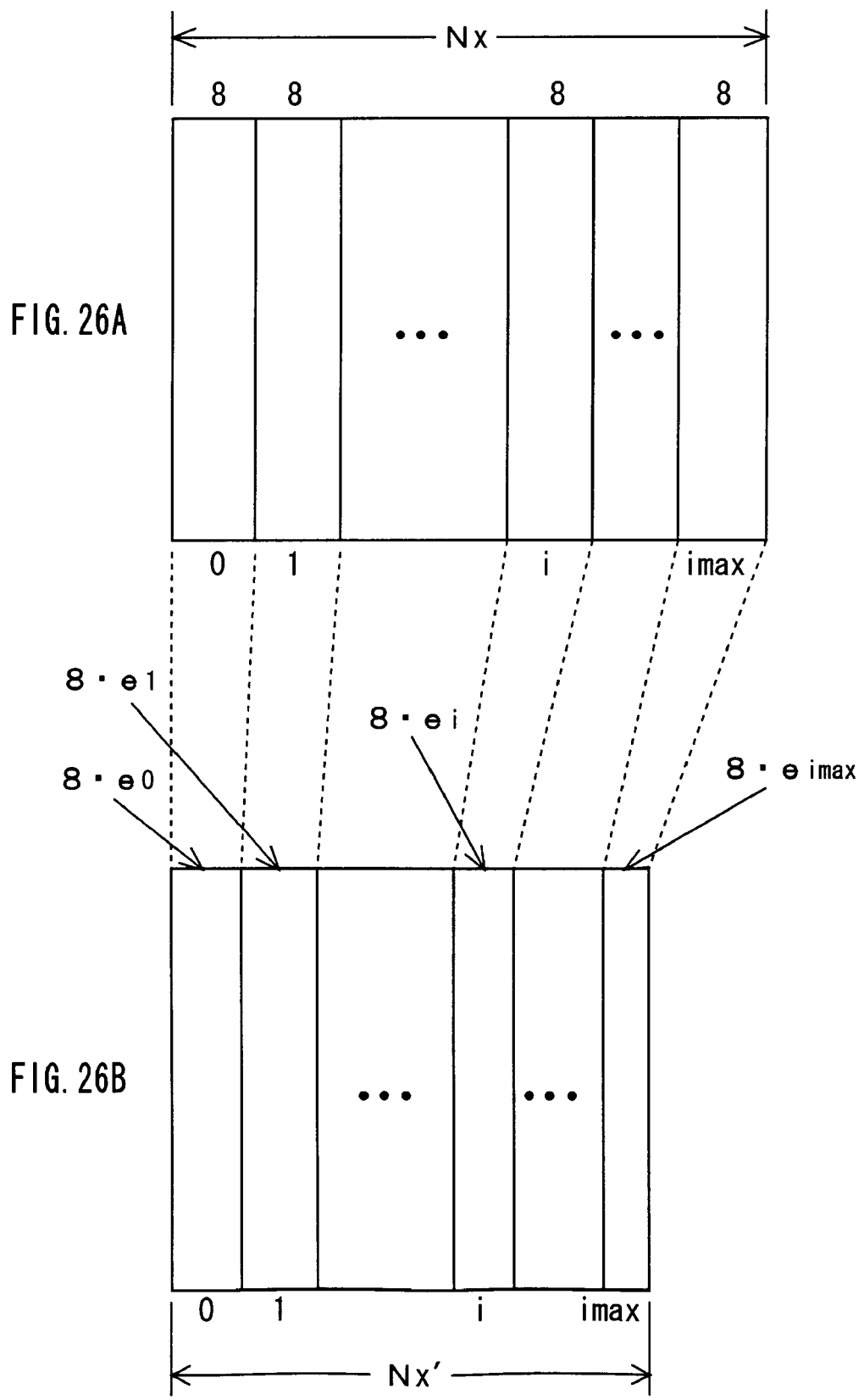
FIGS. 26A and 26B are diagrams each for describing how the horizontal width of each of the strips is determined by using the compression factor 1/b that corresponds to the remainder used for the strip.
Figure 28A:
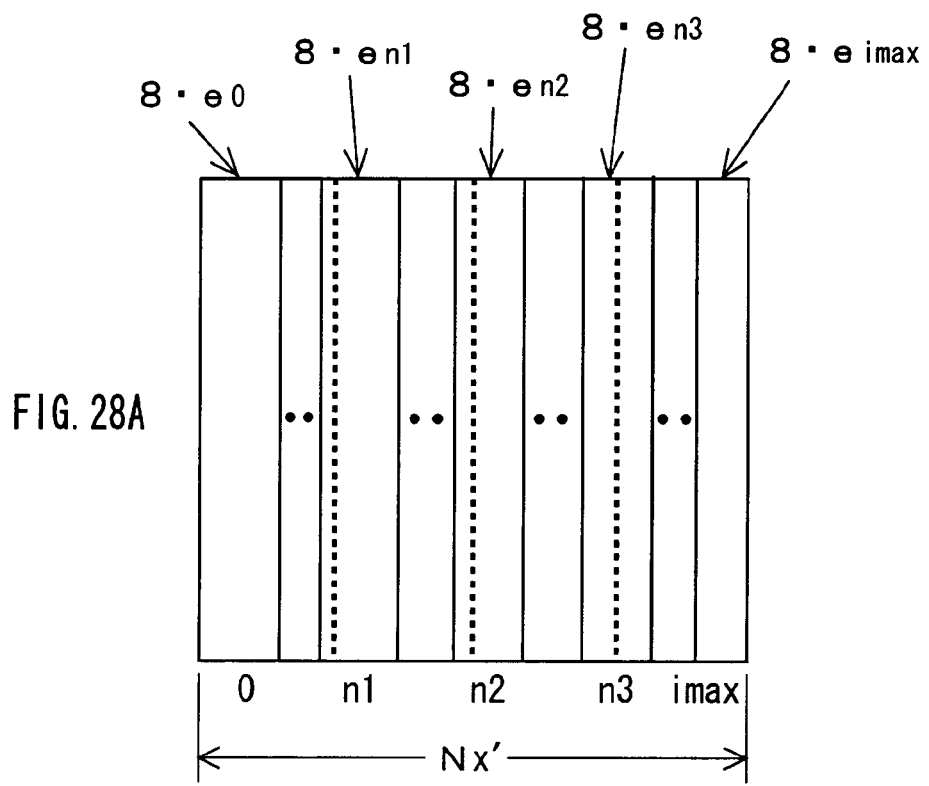
FIGS. 28A and 28B are diagrams each for describing a method for determining horizontal section boundaries by using the horizontal widths of the respective strips.

In this case, each of the strips 0 to imax with eight-pixel width, i.e., each part having eight pixels per row, as shown in FIG. 26A is multiplied by its compression factor e0 to eimax, respectively, to achieve an overall horizontal width Nx'=8e0+ 8e1 . . . +8eimax as shown in FIG. 26B. Then, this Nx' is divided by 4, which is the number of projectors per row in this embodiment, as shown in FIG. 28A. In FIG. 28A, the broken lines represent the boundaries of the sections of the projection image, which are divided by 4.

Figure 28B:
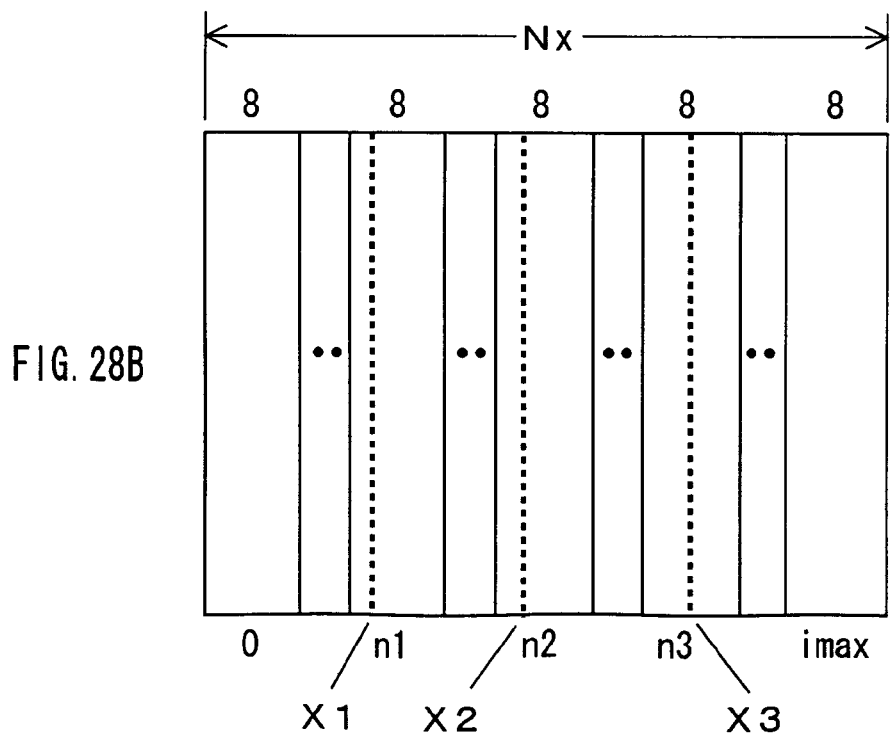

In this context, it is assumed that the boundaries of the sections exist in vertical strips n1, n2 and n3, respectively, as shown in FIG. 28A. For each of the respective vertical strips n1, n2 and n3, a determination is made as to how the boundary divides internally the width of its corresponding strip, and in correspondence to this internal ratio, a determination is made at which position in the eight-pixel width the boundary is located as shown in FIG. 28B. The vertical lines that correspond to these positions, which are determined in the above-mentioned way, are set as the horizontal section boundaries X1, X2 and X3.

Although the above has been described on a process for determining the horizontal section boundaries, a similar process can be applied for determining the vertical section boundaries Y1 and Y2, whose detailed description will be omitted here. In this sense, the projected-section-determining unit 122 contains a second image-information amount calculation portion 122e (see FIG. 27) that calculates the amounts of image information for each horizontal strip aligned in the vertical direction, and the vertical delimitation portion 122c (see FIG. 27) that delimits a vertical section boundary by every horizontal line where the accumulated sum of the amounts of image information equals the quotient of the sum total of the amounts of image information for all the horizontal strips divided by the number of projectors per column, 3 in this embodiment.

As described above, the horizontal and vertical section boundaries, which are used for partitioning the projection image to be projected on the screen 110 by the projectors $101_{-1}$ to $101_{-12}$ into the sections $102_{-1}$ to $102_{-12}$ (projected sections), are determined. In the projected sections $102_{-1}$ to $102_{-12}$, which are partitioned by the horizontal and vertical section boundaries, each section includes an approximately equal amount of image information. In other words, the projected-section-determining unit 122 determines the horizontal and vertical section boundaries such that the same amount of image information is distributed into each section, which is to be projected by its respective projectors.

FIG. 29 shows a flowchart for showing operations of determining the projected sections carried out according to the above second method.

At first, at step ST31, the determination operations start, and at step ST32, the image signal Vin for one frame is input. At step ST33, a compression factor 1/b is selected. At step ST34, horizontal bandwidth-compression image signals are generated at the 1/b selected at the step ST33 (see FIG. 20 and FIG. 21).

Next, at step ST35, the strip number i of the vertical strips is set to 0, and the operation proceeds to step ST36. At the step ST36, for the i-th vertical strip, the differences between the pairs of pixels in the original image signal (Vin) and in the horizontal bandwidth-compression image signals generated at the step ST34 are calculated, and the sum total of the absolute values of the differences is calculated to calculate a remainder I(i, 1/b) (see FIG. 22).

Next, at step ST37, it is determined whether or not the strip number i has reached its maximum strip number imax, i.e., i=imax. If not i=imax, then the strip number i is incremented by one at step ST38. After that, the operation returns to the step ST36. By this returning, the same operations are taken for calculating a remainder I(i, 1/b) for a next vertical strip.

At the step ST37, if i=imax, then this condition means that remainders, I(0, 1/b) to I(imax, 1/b), have been calculated for all the vertical strips O to i max, so the operation proceeds to step ST39 where it is determined whether or not the value selected for the 1/b at the step ST33 is the last one. If it is not the last one, then the operation returns to the step ST33 where the next value is selected for the 1/b. Then, the same operations are taken for calculating the remainder I(i, 1/b) for each of the strips at this 1/b.

If the 1/b has reached its last value at the step ST39, then the operation proceeds to step ST40. At the step ST40, by using the remainder I(0, 1/b) to I(imax, 1/b) for each of the strips 0 to imax generated at each value of the 1/b, a relationship between the remainder for each of the strips 0 to imax and the 1/b is defined (see FIGS. 23A to 23D, and FIG. 24). By using this relationship, the mean value of the 1/b for each of the strips 0 to imax that correspond to each value of the remainders is then calculated to determine the relationship between the remainder and the mean value of the 1/b (see FIG. 25).

Next, at step ST41, by using the relationship between the remainder and the mean value of the 1/b, an applied remainder RD is determined from the pixel number compression ratio RT (=4Nh/Nx) (see FIG. 25), and from the relationship between the remainder for each of the strips 0 to imax and the 1/b (see FIGS. 23A to 23D and FIG. 24), a compression factor 1/b (e0 to eimax) that corresponds to the applied remainder RD for each of the strips 0 to imax is calculated.

Next, at step ST42, for each of the strips 0 to imax with eight-pixel width, each eight-pixel width part is multiplied by each of the compression factors e0 to eimax to determine the horizontal widths 8e0 to 8eimax of each of the vertical strips (see FIGS. 26A and 26B).

Next, at step ST43, the horizontal boundaries are determined. In other words, the total horizontal width Nx' (=8e0+ 8e1 . . . +8ei+ . . . +8eimax) is divided by 4, which are the number of projectors per row, to create the four sections in the projection image in the horizontal direction. Then, every vertical line that is located in each of the vertical strips n1, n2 and n3 where the boundaries for sections exist and corresponds to a boundary location is determined as each of the horizontal section boundaries X1, X2 and X3 (see FIGS. 28A and 28B and FIG. 19).

Now, the operation proceeds to step ST44 where the determination of the vertical boundaries is initiated. The operations to be taken at the step ST44 to step ST54 correspond with those taken at the step ST33 to the step ST43, which are described above, with only the difference of horizontal or vertical.

At the step ST44, a compression factor 1/b is selected. At the step ST45, vertical bandwidth-compression image signals are generated in correspondence to the 1/b, which has been selected at the step ST44 (see FIG. 20 and FIG. 21).

Next, at the step ST46, the strip number j for the horizontal strips is set to 0, and the operation proceeds to the step ST47. At the step ST47, for the j-th horizontal strip, the differences between the pairs of pixels in the original image signals (Vin) and in the vertical bandwidth-compression image signals at the 1/b generated at the step ST45 are calculated, and the sum total of the absolute values of the differences is calculated to determine a remainder I(j, 1/b) (see FIG. 22).

Next, at the step ST48, it is determined whether or not the strip number j has reached its maximum strip number jmax, i.e., j=jmax. If not j=jmax, then the strip number j is incremented by one at the step ST49. Thereafter, the operation returns to the step ST47. By this returning, the same operations are repeated for calculating a remainder I(j, 1/b) for a next horizontal strip.

At the step ST48, if j=jmax, then this means that the remainders I(0, 1/b) to I(jmax, 1/b) for all the vertical strips 0 to jmax have been calculated, so the operation proceeds to the step ST50 where it is determined whether or not the value selected for the 1/b at the step ST44 is the last one. If not the last value, then the operation returns to the step ST44 where the next value is selected for the 1/b. Then, the same operations are repeated for calculating a remainder I(j, 1/b) for each of the strips at this new 1/b.

If the last value for the 1/b at the step ST50, then the operation proceeds to the step ST51. At the step ST51, by using the remainder I(0, 1/b) to I(jmax, 1/b) for each of the strips 0 to jmax, which is generated at each value of the 1/b, a relationship is defined between the remainder for each of the strips 0 to jmax and the 1/b (see FIGS. 23A to 23D and FIG. 24). By using the relationship, the mean value of the 1/b for each of the strips 0 to jmax in correspondence to each value of the remainder is calculated. Then, a relationship is defined between the remainder and the mean value of the 1/b (see FIG. 25).

Next, at the step ST52, by using the relationship between the remainder and the mean value of the 1/b, the applied remainder RD is determined from the pixel number compression ratio RT (=3Nv/Ny) (see FIG. 25). Furthermore, a compression factor 1/b (e0 to ejmax) that corresponds to the applied remainder RD for each of the strips 0 to jmax is calculated from the relationship between the remainder for each of the strips 0 to jmax and the 1/b (see FIG. 23A to 23D and FIG. 24).

Next, at the step ST53, for each of the strips 0 to jmax with eight-pixel width, each eight-pixel width part is multiplied by the compression factors e0 to ejmax to determine the horizontal width 8e0 to 8 ejmax of each vertical strip (see FIGS. 26A and 26B).

Next, at the step ST54, the vertical boundaries are determined. In other words, the overall vertical width Ny' (=8e0+ 8e1+ . . . +8ej+ . . . +8ejmax) is divided by 3, which are the number of projectors per column, to create three sections in the projection image in the vertical direction. Then, every horizontal line that is located in each of the horizontal strips n1 and n2 where the boundaries exit and corresponds to a boundary location is determined as each of the vertical section boundaries Y1 and Y2 (see FIGS. 28A and 28B and FIG. 19).

At step ST55, the operations for determining the sections of the projection image to be projected by the respective projectors terminate.

Thus, the multi-projection system 100 as a preferred embodiment determines the sections (projected sections) $102_{-1}$ to $102_{-12}$ of the projection image 102 to be projected onto the screen 110 by the projectors $101_{-1}$ to $101_{-12}$ on the basis of the input image signal Vin, generates the image signals $V_{-1}$ to $V_{-12}$ for the projectors $101_{-1}$ to $101_{-12}$ on the basis of this projected sections, and controls the projectors $101_{-1}$ to $101_{-12}$ to adjust their centers and ranges of the projections by the projectors.

Therefore, the number of projectors assigned to a section of the projection image which contains the large amount of information per unit area is increased while the number of projectors assigned to a section of the projection image which contains the small amount of information per unit area is decreased. This enables high presentation resolution to be realized without increasing the number of projectors used in the system. From the same reason, in comparison with any related system, the number of projectors for realizing the same resolution can be decreased, thereby realizing cost reduction therefor.

Although in the above embodiments, it has been described that an apparatus and a method that present a projection image are applicable to cases where a still picture is displayed on the screen 110, this invention is not limited thereto. They can be also applied to a case where a slowly changing image is displayed on the screen 110. For displaying the slowly changing image, the multi-projection system 100 shown in FIG. 7 may determine the projected section for each projector by the projected-section-determining unit 122 every predetermined period of time and, on the basis of the result of this determination, the image-signal-generating unit 123 and the projection-center and -range control unit 124 operate.

Furthermore, in the above embodiments, the horizontal boundaries and the vertical boundaries are determined independently without considering the boundaries of each other, so the horizontal and vertical section boundaries that define the sections $102_{-1}$ to $102_{-12}$ of the projection image 102 projected by the projectors $101_{-1}$ to $101_{-12}$ are each continuous as indicated by broken lines in FIG. 5.

However, for example, after the vertical section boundaries are determined, the horizontal section boundaries may be determined for each of the respective vertical sections.

In this moment, in the above-described first method, for each of the respective vertical sections, preferably, horizontal section boundaries are delimited by every vertical line where the accumulated sum of the local DRs equals a quotient of the sum total of the local DRs for the pixels in the respective vertical sections divided by the number of projectors per row.

Also, in this moment, in the above-described second method, for each of the respective vertical sections, preferably, horizontal section boundaries are delimited by every vertical line where the accumulated sum of the amounts of image information equals a quotient of the amount of image information for the respective vertical sections divided by the number of projectors per row.

Figure 30:
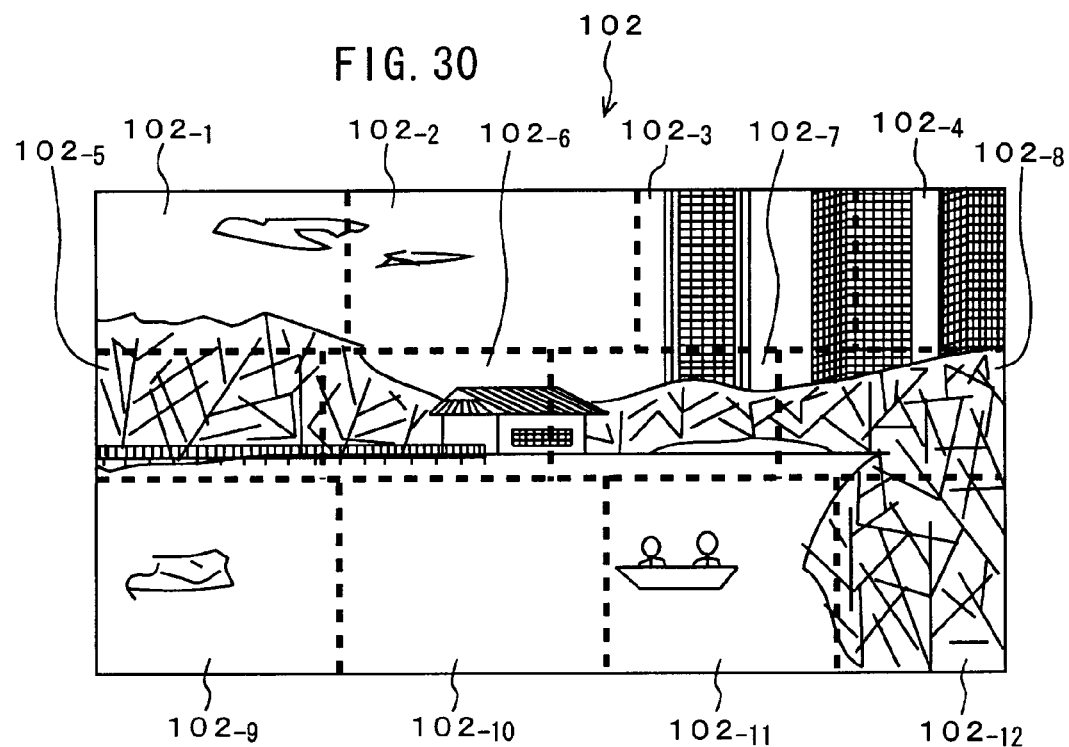
FIG. 30 is a diagram for showing another example of determination of the sections of the projection image projected by the respective projectors.

As a result, the horizontal section boundaries defining the sections $102_{-1}$ to $102_{-12}$ of the projection image 102 projected by the projectors $101_{-1}$ to $101_{-12}$ are continuous, but the vertical section boundaries are not continuous and are positioned different in the respective vertical sections as indicated by broken lines in FIG. 30.

It is also possible that, for example, after the horizontal section boundaries are determined, the vertical section boundaries may be determined for each of the respective horizontal sections.

In this moment, in the above-described first method, for each of the respective horizontal sections, preferably, vertical section boundaries are delimited by every horizontal line where the accumulated sum of the local DRs equals a quotient of the sum total of the local DRs for the pixels in the respective horizontal sections divided by the number of projectors per column.

Also, in this moment, in the above-described second method, for each of the respective horizontal sections, preferably, vertical section boundaries are delimited by every horizontal line where the accumulated sum of the amounts of image information equals a quotient of the amount of image information in the respective horizontal sections divided by the number of projectors per column.

Figure 31:
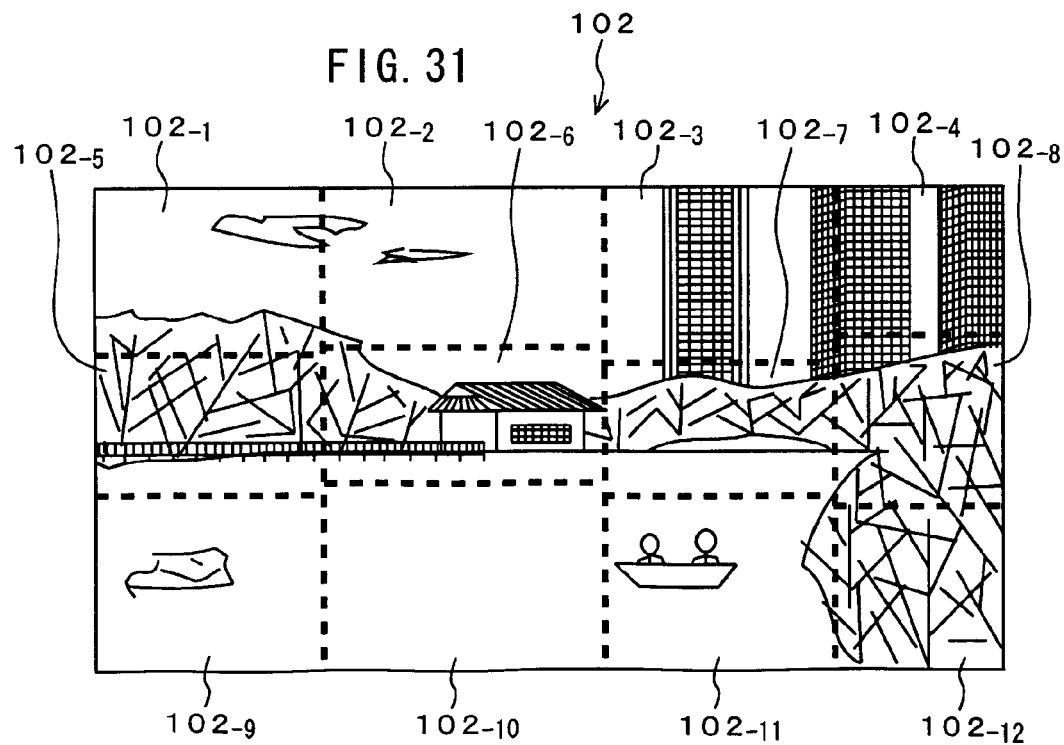
FIG. 31 is a diagram for showing further example of determination of the sections of the projection image projected by the respective projectors.

In this moment, the vertical section boundaries defining the sections $102_{-1}$ to $102_{-12}$ of the projection image 102 projected by the projectors $101_{-1}$ to $101_{-12}$ are continuous, but the horizontal section boundaries are not continuous and are positioned different in the respective horizontal sections as indicated by broken lines in FIG. 31.

Although, in the above embodiments, the multi-projection system 100 containing a total of 12 projectors $101_{-1}$ to $101_{-12}$ arranged in a matrix of four per row and three per column has been described, the number of projectors and their arrangement are, of course, not limited to this.

The apparatus that presents a projection image and the like according to the present invention realizes high presentation resolution without increasing the number of projectors in the whole of the system, by determining as a projected section the section of the projection image to be projected on the screen by each of the projectors on the basis of input image signals, by generating image signals for each projector on the basis of the above determined projected section, and by controlling the projectors to adjust their centers and ranges of the projections by the projectors. Thus, they are suitably applied to, for example, a projection system and the like for displaying, for example, a still picture or a slowly changing image on a screen.

It should be understood by those skilled in the art that various modifications, combinations, sub-combinations and alternations may occur depending on design requirements and other factors insofar as they are within the scope of the appended claims or the equivalents thereof.

What is claimed is:

1. An apparatus that presents a projection image, the apparatus comprising:
   a screen;
   plural projectors, each of which projects a section of the projection image onto the screen to reproduce the projection image;
   a projected-section-determining unit that determines as a projected section the section of the projection image based on an input image signal, said section of the projection image corresponding to a part of the screen onto which each of the projectors projects the section of the projection image;
   an image-signal-generating unit that generates an image signal corresponding to the section of the projection image which each of the projector projects onto the part of the screen, based on the input image signal and the projected section which has been determined by the projected-section-determining unit; and
   a projectors-controlling unit that controls the projectors, respectively, to adjust any one of centers and ranges of the projections by the projectors based on the projected section which has been determined by the projected-section-determining unit, and to adjust a number of projectors assigned to project at least one section of the projection image, based on an amount of information per unit area of the projection image.

2. The apparatus according to claim 1, wherein the projected-section-determining unit calculates a local dynamic range for each pixel based on the input image signal by using a signal relative to the pixel and a predetermined number of other pixels adjacent to the pixel; and
   wherein the projected-section-determining unit determines as the projected section the section of the projection image projected by each of the projectors based on the local dynamic range for each pixel with sum total of the local dynamic ranges for all the projected sections being equal.

3. The apparatus according to claim 2, wherein the plural projectors are arranged in a matrix of rows and columns; and
   wherein the projected-section-determining unit includes
   a dynamic-range-calculating portion that calculates the local dynamic range for each pixel by using the pixel and a predetermined number of other pixels adjacent to the pixel,
   a vertical delimitation portion that delimits a vertical section boundary by every horizontal line based on the local dynamic range for each pixel which has been calculated by the dynamic-range-calculating portion, said horizontal line being determined by making an accumulated sum of the local dynamic ranges equal to a quotient of the sum total of the local dynamic ranges for all the pixels divided by the number of projectors per the column, and
   a horizontal delimitation portion that delimits a horizontal section boundary by every vertical line based on the local dynamic range for each pixel which has been calculated by the dynamic-range-calculating portion, said vertical line being determined by making the accumulated sum of the local dynamic ranges equal to a quotient of the sum total of the local dynamic ranges for all the pixels divided by the number of projectors per the row.

4. The apparatus according to claim 3, wherein the horizontal delimitation portion sets all the pixels as pixels belonging to each vertical section defined by the vertical section boundaries delimited by the vertical delimitation portion; and
   wherein the horizontal delimitation portion delimits the horizontal section boundaries for each vertical section.

5. The apparatus according to claim 3, wherein the vertical delimitation portion sets all the pixels as pixels belonging to each horizontal section defined by the horizontal section boundaries delimited by the horizontal delimitation portion; and
   wherein the vertical delimitation portion delimits the vertical section boundaries for each horizontal section.

6. The apparatus according to claim 1, wherein the projected-section-determining unit calculates, based on the input image signal, an amount of image information for each vertical strip aligned in a horizontal direction and calculates an amount of image information for each horizontal strip aligned in a vertical direction; and
   wherein the projected-section-determining unit determines, based on the amounts of image information for each of the strips, as the projected section the section of the projection image projected by each of the respective projectors by distributing the equal amount of image information to each section.

7. The apparatus according to claim 6, wherein the plural projectors are arranged in a matrix of rows and columns; and
   wherein the projected-section-determining unit includes
   a first image-information amount calculation portion that calculates an amount of image information for each vertical strip aligned horizontally, by using plural bandwidth-compression image signals which are bandwidth-limited horizontally at plural levels and an original image signal thereof,
   a horizontal delimitation portion that delimits a horizontal section boundary by every predetermined vertical line based on the amount of image information for each vertical strip, said amount of image information being calculated by the first image-information amount calculation portion, said predetermined vertical line being determined by making an accumulated sum of the amounts of image information equal to a quotient of the sum total of the amounts of image information for all the vertical strips divided by the number of projectors per the row,
   a second image-information amount calculation portion that calculates an amount of image information for each horizontal strip aligned vertically, by using plural bandwidth-compression image signals which are bandwidth-limited vertically at plural levels and the original image signal thereof, and
   a vertical delimitation portion that delimits a vertical section boundary by every predetermined horizontal line based on the amount of image information for each horizontal strip, said amount of image information being calculated by the second image-information amount calculation portion, said predetermined horizontal line being determined by making the accumulated sum of the amounts of image information equal to a quotient of the sum total of the amounts of image information for all the horizontal strips divided by the number of projectors per the column.

8. The apparatus according to claim 7, wherein the horizontal delimitation portion sets all the vertical strips as vertical strips belonging to the respective vertical sections defined by the vertical section boundaries delimited by the vertical delimitation portion; and wherein the horizontal delimitation portion delimits the horizontal section boundaries for each vertical section.

9. The apparatus according to claim 7, wherein the vertical delimitation portion sets all the horizontal strips as horizontal strips belonging to the respective horizontal sections defined by the horizontal section boundaries delimited by the horizontal delimitation portion; and wherein the vertical delimitation portion delimits the vertical section boundaries for each horizontal section.

10. A method that presents a projection image on a screen by projecting separate sections of the projection image on the screen from plural projectors, said method comprising the steps of:

determining as a projected section each of the sections of the projection image to be projected on the screen by each of the projectors, based on an input image signal;

generating an image signal corresponding to each of the sections of the projection image to be projected on the screen by each of the projectors, based on the input image signal and the projected section determined in the determining step; and controlling the projectors to adjust any one of centers and ranges of projections by the projectors based on the sections of the projection image determined in the determining step, and to adjust a number of projectors assigned to project at least one section of the projection image, based on an amount of information per unit area of the projection image.

11. The apparatus according to claim 1, wherein at least one projected section is a different size than another projected section.

12. The apparatus according to claim 1, wherein the projected-section-determining unit divides the projection image into a plurality of horizontal portions and a plurality of vertical portions.

13. The apparatus according to claim 1, wherein the projectors-controlling unit controls the projectors, respectively, to adjust the number of projectors by increasing the number of projectors assigned to project the at least one section of the projection image in response to the at least one section including a large amount of information per unit area of the projection image, and by decreasing the number of projectors assigned to project the at least one section of the projection image in response to the at least one section including a small amount of information per unit area of the projection image.

* * * * *